(12) United States Patent
Muller et al.

(10) Patent No.: US 7,752,892 B2
(45) Date of Patent: Jul. 13, 2010

(54) LEAK CHARACTERIZATION APPARATUSES AND METHODS FOR FLUID STORAGE CONTAINERS

(75) Inventors: Stuart Muller, Rowley, MA (US); Robert Torres, Jr., Parker, CO (US)

(73) Assignee: Matheson Tri-Gas, Longmont, CO (US)

( * ) Notice: Subject to any disclaimer, the term of this patent is extended or adjusted under 35 U.S.C. 154(b) by 267 days.

(21) Appl. No.: 11/470,868

(22) Filed: Sep. 7, 2006

(65) Prior Publication Data

US 2008/0060421 A1 Mar. 13, 2008

(51) Int. Cl.
*G01M 3/04* (2006.01)
(52) U.S. Cl. ...................................... 73/49.2
(58) Field of Classification Search ........... 73/49.2, 73/37, 40, 40.7
See application file for complete search history.

(56) References Cited

U.S. PATENT DOCUMENTS

| | | | | |
|---|---|---|---|---|
| 3,837,228 A | * | 9/1974 | Nemeth et al. | 73/40.7 |
| 3,888,111 A | * | 6/1975 | Craig | 73/40.7 |
| 5,261,268 A | | 11/1993 | Namba | |
| 5,369,983 A | * | 12/1994 | Grenfell | 73/40.7 |
| 5,625,141 A | * | 4/1997 | Mahoney et al. | 73/40.7 |
| 5,831,147 A | * | 11/1998 | Hoath | 73/49.3 |
| 6,052,057 A | | 4/2000 | Yang et al. | |
| 6,079,252 A | * | 6/2000 | Tabler et al. | 73/40 |
| 6,286,362 B1 | * | 9/2001 | Coffman et al. | 73/40.7 |
| 6,324,892 B1 | | 12/2001 | Nishina et al. | |
| 6,530,264 B1 | * | 3/2003 | Rink et al. | 73/40.7 |

OTHER PUBLICATIONS

Alcatel Vacuumm Technology, "Multipurpose Leak Detectors-ASM Graph/ASM 142 Series", Adixen, Apr. 2006, pp. 16.
MKS, "Gas Analysis-Vision 1000-P-High Performance Process Monitoring System", www.MKSINST.COM, Nov. 2005, pp. 4.

* cited by examiner

*Primary Examiner*—John Fitzgerald
(74) *Attorney, Agent, or Firm*—Townsend and Townsend and Crew LLP

(57) ABSTRACT

According to the invention, an apparatus to characterize leaks in a fluid storage container is disclosed. The apparatus may include a valve coupler, a gas manifold and a processor. The valve coupler may couple the apparatus with a closed valve on the fluid storage container. The gas manifold may be coupled with the valve coupler and may include a first branch connected with a gas monitoring device. The gas monitoring device may scan for a plurality of gases that may be emitted by the closed valve of the fluid storage container. The processor may be operable to receive gas monitoring device data representing masses for one or more of the plurality of gases detected by the monitor.

5 Claims, 11 Drawing Sheets

LEAK CHARACTERIZATION APPARATUSES AND METHODS FOR FLUID STORAGE CONTAINERS

BACKGROUND OF THE INVENTION

Figure 1:
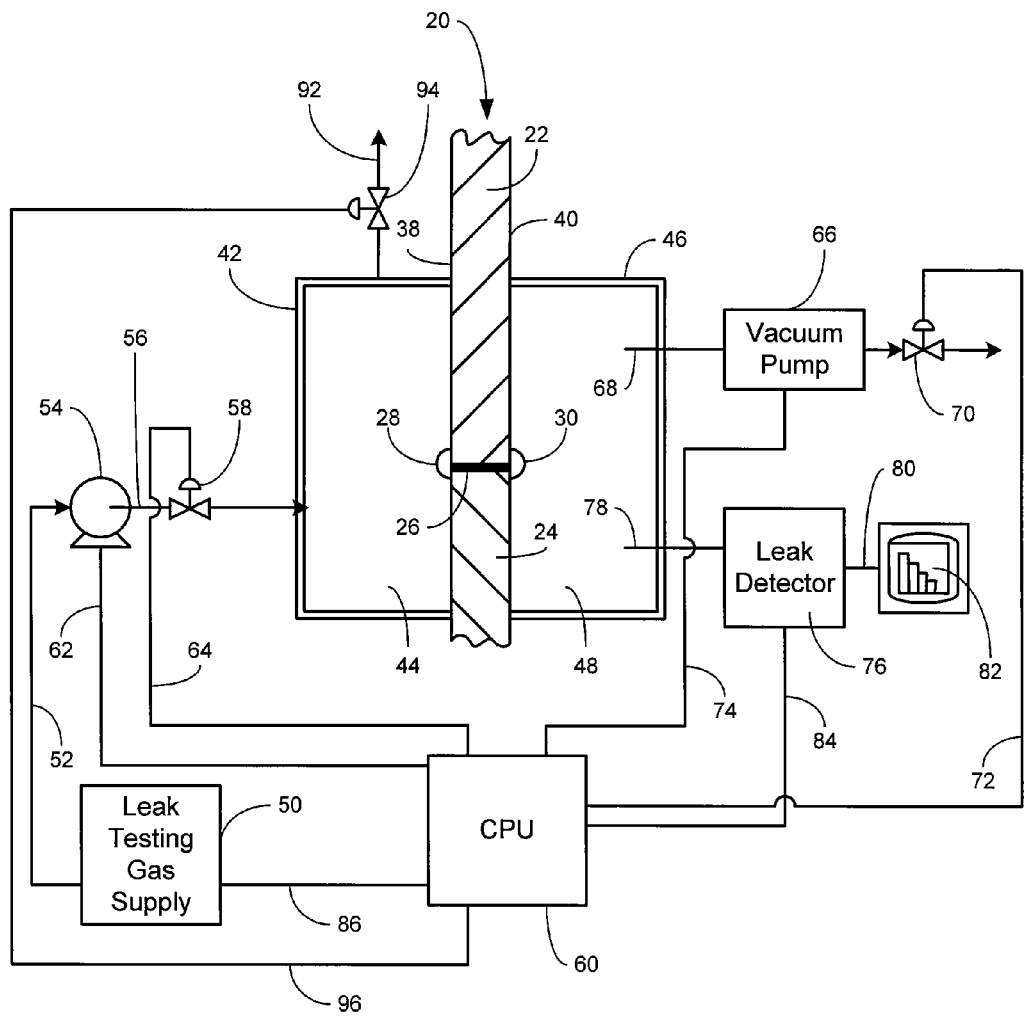

This invention relates generally to leak detection. More specifically the invention relates to leak detection for gas cylinders and valves.

In the use of packaged gases, conventional practice in many industrial applications has been to utilize high-pressure cylinders for storage, transport and dispensing of a wide variety of gases. In these applications, gas is contained in the cylinder in a compressed state, to maximize the inventory of the gas available for dispensing and ultimate use.

Since pressure of such compressed gases typically greatly exceeds atmospheric pressure, structural integrity of the gas package is critical to safety in the use of such packages, since any leakage from a high-pressure container will quickly spread to the surrounding environment of the container. Where the gas is hazardous, e.g., toxic, pyrophoric, or otherwise detrimental to health or safety of persons exposed to same, or deleterious to the environment or operability of facilities in the vicinity of the container, structural integrity of the gas-containment package is vitally important to user acceptance and commercial success of the package.

For these reasons, it has been common practice in the gas industry to leak test gas packages, such as conventional high-pressure cylinders, e.g., by methods in which the sealed high-pressure vessel, or a portion thereof having joints or seams susceptible to leakage, is submerged in or contacted with liquid to determine the presence of leaking gas by bubble formation, or by methods using detectors that are sensitive to the gas of interest, such as leak-testing the sealed vessels with "gas sniffer" devices coupled to chemical analyzers.

In view of the safety and reliability issues involving packages of high-pressure gases in the semiconductor industry, efforts have been made in recent years to significantly increase the safety of gas packaging. This effort has produced sorbent-based fluid storage and delivery systems, such as those described in U.S. Pat. No. 5,518,528, in which gas is adsorbed and stored on a physical adsorbent in a fluid storage and dispensing vessel and is desorbed from the adsorbent and discharged from the vessel under dispensing conditions. In these systems, the gas can be stored and dispensed at subatmospheric pressure levels, typically below about 700 ton. Such physical adsorbent-based systems are commercially available from ATMI, Inc. (Danbury, Conn., USA) and Matheson Tri-Gas, Inc. (Parsippany, N.J., USA) under the trademarks SDS and SAGE.

More recently, an enhanced safety fluid storage and dispensing system has been developed, in which fluid is contained in a vessel having a fluid pressure regulator in the interior volume of the vessel. Such arrangement is effective to permit fluid to be stored at high pressures, with the regulator being operative to discharge fluid from the vessel only when it sees a downstream pressure that is below the set point of the regulator. Such internally disposed regulator systems are more fully described in U.S. Pat. Nos. 6,101,816 and 6,089,027, and are commercially available from ATMI, Inc. (Danbury, Conn., USA) under the trademark VAC.

Despite these developments of safer gas packaging, it remains critical for gas packages to be fabricated without the occurrence of, or potential for, gas leakage at seams, joints and fittings. Toward such objective, safe, effective and reproducible leak-testing is vital to verify that pressurized gas vessels are leak-free in character, and this is particularly true in the semiconductor manufacturing industry, where reagent gases may be extremely toxic and even lethal at low concentrations, in some instances as low as parts-per-million or even parts-per-billion.

In consequence, the art continues to seek improvements in systems and techniques for determining the presence of leaks in vessels employed for packaging of gases, and in verifying the suitability of such vessels for extended leak-free service.

BRIEF DESCRIPTION OF THE INVENTION

The present invention relates to apparatus and process for leak-testing of vessels employed for storage and dispensing of fluids, or of other articles required to be leak-tight in use.

In one aspect, the invention relates to a system for leak-testing an article required to be fluid leak-tight in use at a fluid-contacting region thereof, to determine fluid leakage through the article to a potential leak-expression region of the article, such system including a leak-testing fluid held in confinement by the fluid-contacting region of the article, a vacuum assembly arranged for establishing a vacuum environment at the potential leak-expression region of the article, and a leak detector arranged to detect presence or absence of the leak-testing fluid in the vacuum environment, to determine fluid leakage through the article.

In another aspect, the invention relates to an apparatus for leak-testing a vessel employed for dispensing of fluid, including an evacuatable chamber adapted to contain a vessel holding a leak-testing fluid, e.g., at superatmospheric pressure, a vacuum system arranged to pump down the evacuatable chamber to establish vacuum therein, and a leak detector joined in fluid communication with the evacuatable chamber and operative to detect leakage from the vessel holding leak-testing fluid into the chamber when pumped down by the vacuum system.

In a further aspect, the invention relates to an apparatus for leak-testing an article required to be fluid-tight in use, including an evacuatable chamber adapted to contain the article in an arrangement in which the article confines a leak-testing fluid, e.g., at superatmospheric pressure, a vacuum system arranged to pump down the evacuatable chamber to establish vacuum therein, and a leak detector joined in fluid communication with the evacuatable chamber and operative to detect leakage of leak-testing fluid from or through the article under the vacuum established in the evacuatable chamber when pumped down by the vacuum system.

A further aspect of the invention relates to a method of leak-testing an article required to be fluid leak-tight in use at a fluid-contacting region thereof, to determine fluid leakage through the article to a potential leak-expression region of the article, in which the method includes holding a leak-testing fluid in confinement by the fluid-contacting region of the article, establishing a vacuum environment at the potential leak-expression region of the article, and detecting presence or absence of the leak-testing fluid in the vacuum environment, to determine fluid leakage through the article.

A still further aspect of the invention relates to a method of leak-testing a vessel employed for dispensing of fluid, comprising introducing into the vessel a leak-testing fluid, e.g., at superatmospheric pressure, sealing the leak-testing fluid in the vessel, exposing the sealed vessel to vacuum and measuring leakage of the leak-testing fluid from the vessel.

In yet another aspect, the invention relates to an apparatus for leak-testing a vessel employed for dispensing of fluid, including: a chamber adapted to (i) contain a vessel having vacuum therein, and (ii) have a leak-testing fluid introduced therein, to provide an environment of the leak-testing fluid, surrounding the vessel in the chamber; a vacuum system arranged to establish the vacuum in the vessel; and a leak detector arranged for fluid communication with the vessel having vacuum therein, and operative to detect leakage into the vessel of leak-testing fluid from the leak-testing fluid environment surrounding the vessel in the chamber.

In another aspect, the invention relates to an apparatus for leak-testing an article required to be fluid-tight in use, including: a chamber adapted to contain the article in an arrangement in which the article confines a vacuum, and the chamber has a leak-testing fluid introduced therein, so that leak-testing fluid is present in an environment surrounding the article required to be leak-tight in use; a vacuum system arranged to establish vacuum confined by the article; and a leak detector joined in fluid communication with the vacuum confined by the article and operative to detect leakage of leak-testing fluid into the vacuum confined by the article.

A still further aspect of the invention relates to a method of leak-testing a vessel employed for dispensing of fluid, comprising evacuating the vessel to establish vacuum therein, sealing the vessel, externally exposing the sealed vessel to a leak-testing fluid, and measuring leakage of the leak-testing fluid into the vessel.

In one embodiment, an apparatus to characterize leaks in a fluid storage container is provided. The apparatus may include a valve coupler, a gas manifold, and an indicator device. Some embodiments may also include a processor. The valve coupler may couple the apparatus with a closed valve on the fluid storage container. The gas manifold may be coupled with the valve coupler, where the gas manifold includes a first branch connected with a gas monitoring device. The gas monitoring device may scan for a plurality of gases that may be emitted by the closed valve of the fluid storage container. The indicator device may be operable to communicate a leak has been detected based at in part on gas monitoring device data. The processor may be operable to receive gas monitoring device data representing masses for one or more of the plurality of gases detected by the monitor.

In another embodiment, a system to characterize leaks in a fluid storage container is provided. The system may include an evacuatable chamber, a gas manifold and an indicator device. Some embodiments may also include a processor. The evacuatable chamber may store the fluid storage container. The gas manifold may be coupled with the evacuatable chamber, where the gas manifold includes a first branch connected with a gas monitoring device. The gas monitoring device may scan for a plurality of gases that may be emitted by the fluid storage container. The indicator device may be operable to communicate a leak has been detected based at in part on gas monitoring device data. The processor may be operable to receive gas monitoring device data representing masses for one or more of the plurality of gases detected by the monitor.

In another embodiment, a method to characterize a leak in a fluid storage container is provided. The method may include a step of connecting a valve on the fluid storage container with a leak characterization apparatus. The leak characterization apparatus may include a gas manifold, where the manifold is in fluid communication with a valve coupler that connects with the valve on the container and a gas monitoring device. The method may further include a step of evacuating the gas manifold. The method may also include scanning the evacuated manifold with the gas monitoring device for a plurality of gases that may be emitted by the fluid storage container. The method may moreover include a step of generating leak characterization data about one or more of the plurality of gases.

In another embodiment, a method to characterize a leak in a fluid storage container is provided. The method may include a step of placing the fluid storage container in an evacuatable chamber fluidly coupled with a gas monitoring device. The method may also include evacuating the chamber and scanning the chamber with the gas monitoring device for a plurality of gases that may be emitted by the fluid storage container. The method may further include a step of generating leak characterization data about one or more of the plurality of gases.

In one embodiment, an apparatus for determining a leak rate of a gas from a closed valve is provided. The apparatus may include a vacuum pump, a pressure measuring device, a monitoring device, and a computer. The vacuum pump may be configured to couple with a downstream side of the closed valve, wherein the downstream side of the closed valve is characterized by a pressure, and decrease the pressure of the downstream side of the closed valve. The pressure measuring device may be configured to couple with the downstream side of the closed valve, and determine the pressure of the downstream side of the closed valve. The monitoring device may be configured to couple with the downstream side of the closed valve, and monitor a gas on the downstream side of the closed valve. The gas may be characterized by a mass of the gas that is emitted from the closed valve, and the monitoring device may be configured to determine the mass of the emitted gas. The computer may be configured to control the vacuum pump based at least in part on the pressure, and determine the leak rate of the gas based at least in part on the mass of the emitted gas.

In another embodiment, an apparatus for determining a leak rate of a gas from a closed valve is provided. The apparatus may include a means for decreasing a pressure of a downstream side of the closed valve, a means for measuring the pressure of the downstream side of the closed valve, a means for controlling the means for decreasing the pressure of the downstream side of the closed valve based at least in part on the pressure, a means for determining a concentration of a gas on the downstream side of the closed valve, and a means for determining the leak rate of the gas based at least in part on the determined concentration of the gas.

In another embodiment, a method of determining a leak rate of a gas from a closed valve is provided. The method may include decreasing the pressure of a downstream side of the closed valve, determining the pressure of the downstream side of the closed valve, monitoring a gas on the downstream side of the closed valve, wherein the gas is characterized by a concentration and a molecular mass, and determining the leak rate of the gas based at least in part on the concentration or the molecular mass.

In another embodiment, a method to characterize a leak in a fluid storage container is provided. The method may include placing the fluid storage container in an evacuatable chamber fluidly coupled with a gas monitoring device, evacuating the chamber, introducing a first reactive fluid into the chamber, wherein the first reactive fluid reacts with a fluid that may be emitted by the fluid storage container to produce particles, scanning the chamber with the gas monitoring device for a plurality of gases that may be emitted by the fluid storage container, evacuating fluid from the chamber and scanning the evacuated fluid with a particle counter, and generating leak characterization data about one or more of the plurality of gases based at least in part on data from the gas monitoring device and data from the particle counter.

In another embodiment, a method to characterize a leak in a fluid storage container is provided. The method may include placing the fluid storage container in an evacuatable chamber fluidly coupled with a gas monitoring device, evacuating the chamber, introducing a reactive fluid into the chamber, wherein the reactive fluid reacts with a fluid that may be emitted by the fluid storage container to produce particles, evacuating fluid from the chamber and scanning the evacuating fluid with a particle counter, and generating leak characterization data about one or more of the plurality of gases based at least in part on data from the particle counter.

Other aspects, features and embodiments of the invention will be more fully apparent from the ensuing disclosure and appended claims.

BRIEF DESCRIPTION OF THE DRAWINGS

The present invention is described in conjunction with the appended figures:

FIG. 1 is a schematic view of a leak detection system according to one embodiment of the present invention;

FIG. 2 is a schematic view of a leak detection system according to another embodiment of the present invention;

FIG. 3 is a schematic representation of a leak testing system according to yet another embodiment of the invention, as adapted for automated leak-testing of multiple vessels;

FIG. 4 is a schematic view of a leak detection system according to a further embodiment of the present invention;

FIG. 5 is a schematic view of a leak testing system according to yet another embodiment of the invention, as adapted for automated leak-testing of multiple vessels;

FIG. 6 is a schematic view of an apparatus according to one embodiment of the invention for determining a leak rate of a gas from a closed valve;

FIG. 7 is a block diagram of a method according to one embodiment of the invention for determining a leak rate of a gas from a closed valve;

FIG. 8 is a block diagram of a method according to an embodiment of the invention for characterizing a leak in a fluid storage container;

FIG. 9 is a block diagram of a method according to another embodiment of the invention for characterizing a leak in a fluid storage container;

FIG. 10 is a block diagram of a method according to another embodiment of the invention for characterizing a leak in a fluid storage container using both a particle counter and possibly a gas monitoring device.

FIG. 11 is a block diagram of an exemplary computer system capable of being used in at least some portion of the apparatuses or systems of the present invention, or implementing at least some portion of the methods of the present invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term “machine-readable medium” includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention relates to apparatus and process for leak-testing of vessels employed for storage and dispensing of fluids, including vessels that are used for holding gases, as well as vessels that are used for holding pressurized liquids, and vessels that are used for holding pressurized solid source reagents that are volatilized in the vessel to yield fluid for dispensing.

The present invention is based on the discovery that the sensitivity of leak-testing of vessels containing pressurized leak-testing gas can be increased by many orders of magnitude, e.g., four or even five orders of magnitude, by subjecting the vessel being leak-tested to vacuum, and then detecting leakage from the vessel in vacuo. This increase in sensitivity of the leak-testing process was completely unexpected. Moreover the level of gas leakage that is detectible by such method and associated apparatus is reduced to such low levels that it becomes possible to qualify vessels in a highly precise manner as being free from leaks not only at the time of testing, as also as being free of the probability of later developing leaks, i.e., during the subsequent storage, transport and use of the vessel.

Although described specifically hereinafter in reference to fluid dispensing vessels of a type used in industrial applications such as semiconductor manufacturing, it will be appreciated that the apparatus and process of the invention are broadly applicable to leak testing of any vessels that are susceptible to leakage of pressurized products, as well as to leak testing of any other structural articles or elements that are required to be leak-tight in use, as containing or confining pressurized material(s).

Further, also the invention is illustratively described hereinafter as utilizing a helium detector as the leak detector for leak-testing and qualification of fluid dispensing vessels, it will be appreciated that a wide variety of other types of detectors can be employed within the broad scope of practice of the invention, such as mass spectrometer that is tuned to detect the specific leak-testing gas of interest, or a flame ionizer analyzer, atomic emission analyzer, a Fourier Transform-Infrared (FTIR) detector, or other suitable detector appropriate for the leak-testing gas that is involved.

Additionally, although the invention is illustratively described hereinafter as involving leak-testing of vessels with a leak-testing fluid, prior to fill of the vessels with chemical reagent product for subsequent fluid dispensing, it will be recognized that the invention may be practiced with leak-testing of the vessel after it is filled with the product of interest. For example, if the vessel is filled with arsine gas as the product to be dispensed, the post-fill leak testing can be carried out with a mass spectrometer that is tuned specifically for detection of arsine. Alternatively, both pre-fill and post-fill leak testing of the same vessel can be utilized to increase the level of assurance that the vessel will not display leaking behavior in post-fill use.

In application to a fluid storage and dispensing vessel, the present invention may be carried out for leak-testing of the vessel with imposition of vacuum either on the interior volume of the vessel, so that in-leakage into such interior volume is monitored, or alternatively, the vacuum may be imposed on the exterior of the fluid storage and dispensing vessel so that any out-leakage of gas into the vacuum environment of the vessel is detected.

The vacuum may be imposed at any suitable sub-atmospheric pressure level appropriate to the test and the sensitivity of the detection systems that are employed for determining the existence of leakage. Typically, it is desired to impose vacuum that is below 100 torr, more preferably below 50 torr, even more preferably below 20 torr and most preferably below 10 torr, the specific level being readily determinable within the skill of the art for a given detection system and monitored leakage component.

When helium is employed as the leak testing gas, a particularly preferred leak detector is the Alcatel AMS 142 Helium Leak Detector, commercially available from Alcatel Vacuum Technology, Paris, France. In low pressure environments, leak rates down to $10^{-10}$ cc helium/sec are detectable by such leak detector.

The vacuum imposed on the structure to be tested for leak-tightness may be applied by means of a suitable vacuum pump, cryopump, exposure to getters for chemisorbing gas in the environment being evacuated, etc.

The leak detector used in a given application of the invention may be calibrated using suitable calibrated sources. For example, in one embodiment of the invention, wherein helium is the leak-testing gas, calibrated sources providing leak rates of $10^{-7}$, $10^{-8}$ and $10^{-9}$ cc hydrogen/sec can be employed. The resulting calibration then is employed to ensure accuracy of the detector, which may for example being capable when properly calibrated of detecting helium leaks in the $10^{-7}$ to $10^{-9}$ cc helium/sec range.

The method of the invention may be employed to establish a pass/fail criterion for leak-tightness and acceptance or rejection of products of various types. In one embodiment of the invention, the leak-testing is conducted to determine the existence of leakage at the neck joint of a gas containment vessel, e.g., at a neck opening that is threaded to mate with a correspondingly threaded valve head assembly, e.g., including a dispensing valve and a manual actuator or automatic actuator for the valve.

In one embodiment, the present invention takes advantage of the fact that the sensitivity of leak-testing of vessel can be increased, by evacuating the vessel being leak-tested so that it contains vacuum, surrounding the vessel, or a portion thereof required to be leak-tight in use, with leak testing fluid and then detecting leakage into the evacuated vessel. Such increase in sensitivity of the leak-testing process is completely unexpected. Moreover, the level of gas leakage that is detectable by such method and associated apparatus is reduced to low levels and it becomes possible to qualify vessels, as more generally discussed hereinabove.

Referring now to the drawings, FIG. 1 is a schematic view of a leak detection system 10 according to one embodiment of the present invention. The system 10 as illustrated is being employed to leak test the structural article 20. Article 20 includes wall members 22 and 24 that abut one another at the bottom edge of wall member 22 and the top edge of wall member 24, thereby defining a seam 26 between the respective wall members. The wall members 22 and 24 in such manner form a wall assembly having a first surface 38 and a second surface 40. The seam 26 of the wall assembly is secured by weld 28 on the first surface 38 of the wall and by a weld 30 on the second surface 40.

In use, the wall assembly of article 20 is employed to confine a pressurized fluid and is required to be of a leak-tight character.

The leak detection system 10 used to test article 20 includes a pressurization enclosure 42 that is shown as being sealingly engaged with the first surface 38 of the article 20. By this arrangement, the enclosure 42 defines with the first surface 38 an enclosed volume 44. Joined in flow communication with the enclosed volume 44 of the enclosure 42 is a leak-testing gas supply 50, which supplies leak-testing gas to the enclosed volume 44 by means of line 52 interconnecting the leak-testing gas supply 50 with pump 54, with the pump in turn operating to deliver the leak-testing gas to the enclosed volume 44 in line 56 containing flow control valve 58 therein. The pressurization enclosure 42 is provided with a vent line 92 having flow control valve 94 therein.

The leak detection system 10 further includes a vacuum enclosure 46 that is shown as being sealingly engaged with the second surface 40 of the article 20, to form with the second surface an enclosed volume 48. Joined to the enclosed volume 48 of the vacuum enclosure 46 is a vacuum pump 66 in line 68 containing flow control valve 70 therein. Also joined to the enclosed volume 48 of the vacuum enclosure 46 by line 78 is a leak detector 76. The leak detector 76 is arranged to detect the presence or absence of the leak-testing gas in the enclosed volume 48 of the vacuum enclosure 46 and to responsively transmit an output in signal transmission line 80 to the output display monitor 82, for graphical outputting of the detection result.

The leak detection system in the FIG. 1 embodiment includes a CPU 60 that is coupled to leak-testing gas supply 50 by signal transmission line 86, to pump 54 by signal transmission line 62, to flow control valve 58 by signal transmission line 64, to flow control valve 94 by signal transmission line 96, to vacuum pump 66 by signal transmission line 74, to flow control valve 70 by signal transmission line 72, and to leak detector 76 by signal transmission line 84.

The CPU 60 in the FIG. 1 embodiment can be of any suitable type, e.g., a general purpose programmable computer, a microprocessor, a programmable logic controller, or other processor, which by means of the respective signal transmission lines 86, 62, 64, 96, 72, 74 and 84 is coupled in signal transmission relationship to pump 54, leak-testing gas supply 50, flow control valve 58, flow control valve 94, vacuum pump 66, flow control valve 70 and leak detector 76. The respective signal transmission lines enable the CPU 60 to control the operation of the components coupled thereto, in accordance with a cycle timer program or in other manner, so that the leak-testing operation is carried out in an efficient and reproducible manner.

In operation of the FIG. 1 system, the leak detector can be calibrated in any suitable manner, such as for example by connecting line 78 to a calibration standard, e.g., a source of leak detector calibration gas in a container that releases the calibration gas at a controlled accurate leak rate, so that the leak detector can be accurately calibrated by reference thereto. More than one calibration standard can be employed, to ensure that the leak detector is appropriately calibrated for subsequent leak detection operation. As another alternative, a calibration standard may be installed in the interior volume 48 of vacuum enclosure 46, and after the enclosure is pumped to establish vacuum in the enclosure, the leak detector is actuated to detect the leak rate of the calibration standard, so that the leak detector may be adjusted for accurate further operation.

Once the leak detector 76 is calibrated, the CPU by signals in lines 86, 62, 64 and 96 causes leak testing gas supply 50 to open for dispensing, flow control valves 58 and 94 to open, and pump 54 to pump leak testing gas from the supply 50 through line 52 into pressurization chamber 42 and into vent line 92 for purging of the pressurization chamber. After the pressurization chamber 42 has been purged of gas other than the leak testing gas, the CPU transmits a signal in line 96 to close the flow control valve 94. The flow of leak testing gas into chamber 42 continues until the chamber is at a predetermined pressure of leak testing gas, whereupon the CPU 60 transmits a signal in line 64 to shut the flow control valve 58.

Contemporaneously (before, during and/or after the pressurization of the chamber 42 with leak testing gas), the vacuum pump 66 is actuated by a control signal from CPU 60 in line 74 and flow control valve 70 is opened by control signal from CPU 60 in line 72, so that the gas resident in the vacuum chamber 46 is exhausted from the chamber in line 68 by the action of the vacuum pump, so that a vacuum condition is established in the vacuum chamber 46. The vacuum pump upon reaching of the desired vacuum condition may be shut off by the CPU and the valve 70 closed to maintain the vacuum condition in the vacuum chamber, or alternatively the pump 66 may be operated in a back-up mode, to maintain the vacuum pressure in the chamber 46 at a desired level.

With the vacuum condition established in the vacuum chamber 46, the leak detector is actuated by a signal from CPU 60 in line 84, whereby sampling of the vacuum chamber environment is carried out by flow (diffusion) of gas from the interior volume 48 of the vacuum chamber 46 to the leak detector 76. The leak detector 76 responsively transmits an output signal in line 80 to the monitor 82 for graphical outputting of the leak testing operation results. The leak detector can also contain or be associated with alarm or recorder devices indicating when there is a leakage above the predetermined threshold for acceptance or rejection of the article 20 as being suitably leak-tight in character, or alternatively as lacking such leak-tightness. For this purpose, the leak detector can output a signal to the CPU 60 in line 84 to terminate the leak-testing, when a defective article 20 is determined to be unsuitable for its intended fluid containment or fluid confinement application.

When the leak testing determination has been made, the CPU functions to deactuate the leak testing system so that the article 20 can be disengaged from the respective pressurization and vacuum chambers, e.g., to prepare the system for leak testing of the next succeeding article to be assessed for leak-tightness.

It will be appreciated that in lieu of separate leak detector and vacuum pump components in the system as shown in FIG. 1, the system alternatively can be configured so that the vacuum pump and leak detector are consolidated in an integrated, unitary leak detector and vacuum pump assembly. Further, although it is preferred to introduce the leak-testing fluid into the vessel at superatmospheric pressure, it will be appreciated that the leak-testing fluid may alternatively in some applications be introduced at atmospheric, or even subatmospheric pressure (although any subatmospheric pressure should be sufficiently above the vacuum pressure level to increase efficient leak-testing).

Figure 2:
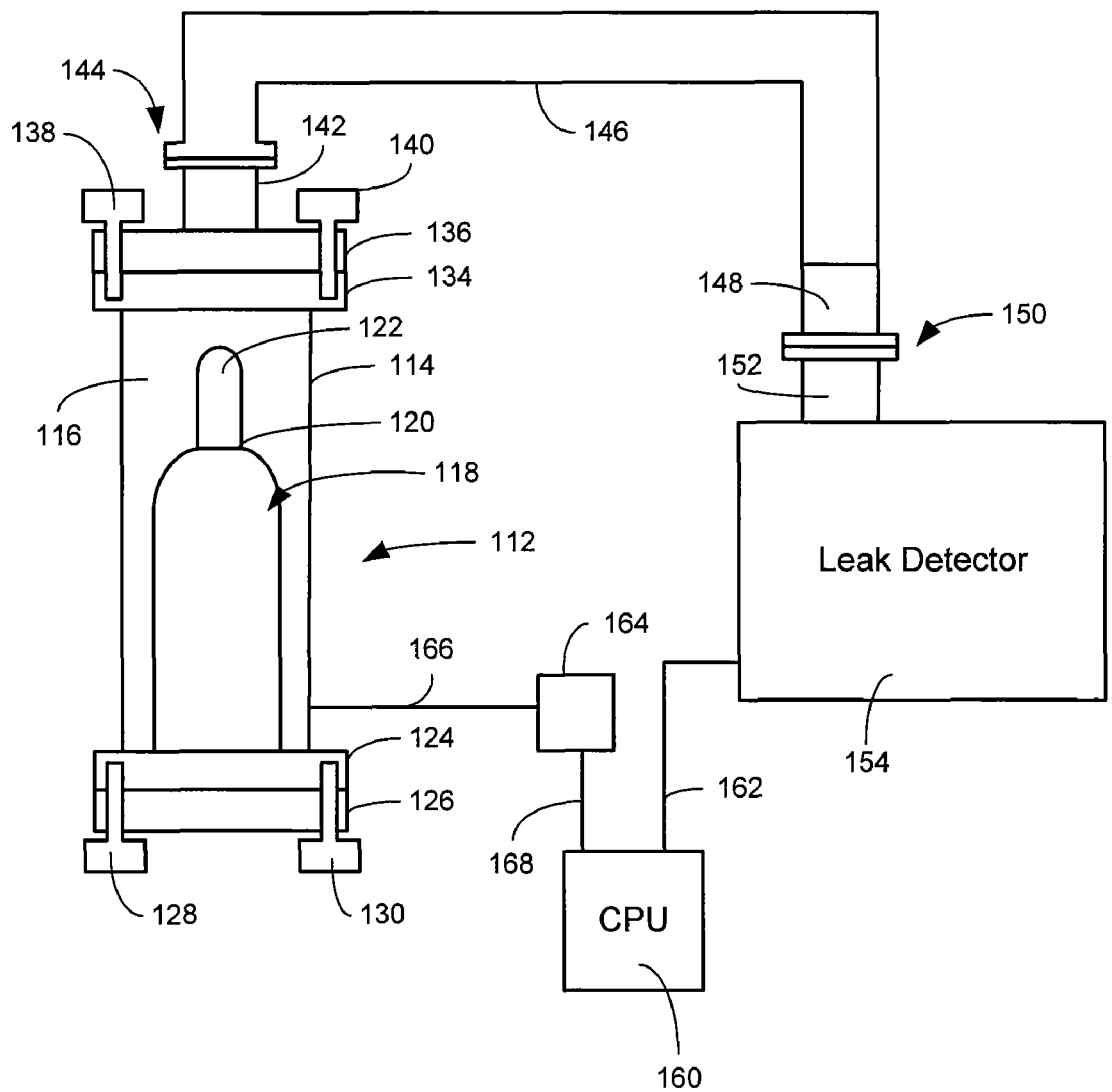

FIG. 2 is a schematic view of a leak detection system according to another embodiment of the present invention. The illustrated leak-testing system 110 includes evacuatable chamber 112 including chamber housing 114 circumscribing an enclosed interior volume 116 between flange elements at lower and upper ends of the housing. The lower end of the housing is bounded by a flange assembly including upper flange 124, lower flange 126 and screw-type mechanical fasteners 128 and 130 interconnecting such flanges. The upper flange 124 of such assembly may be brazed, welded, soldered or otherwise secured to the chamber housing 114, and advantageously is of a same size as the lower flange 126, so as to facilitate mating and engagement of such flanges to form the flange assembly.

In like manner, the chamber housing 114 at its upper end has a flange 134 secured thereto, and matably engagable with flange 136, so that the respective flanges can be secured in position by screw-type mechanical fasteners 138 and 140, as shown.

In the flange assembly including upper flange 134 and lower flange 136, the upper flange has a port extension 142 secured thereto. The port extension 142 terminates in a flange that is matably engaged with a complimentary flange of the conduit 146. By this arrangement, the respective flanges of the port extension and conduit form a flange assembly 144. This flange assembly may be mechanically interlocked in a conventional or otherwise known manner, e.g., by a collar clamp, or by interconnecting bolt and nut assemblies, or in other appropriate manner.

The conduit 146 at its opposite end from the flange assembly 144 is secured to a terminal section 148, such as by welding, brazing, soldering, bonding, or use of mechanical fasteners. The terminal section 148 of conduit 146 terminates in a flange that is matably engageable with a complimentary flange of the port extension 152, thereby forming a flange assembly 150. Such flange assembly also can be mechanically interlocked in a conventional or otherwise known manner, e.g., by a collar clamp, or by interconnecting bolt and nut assemblies, or in other appropriate manner.

The port extension 152 is coupled with leak detector 154. The leak detector 154 may be of any suitable type, having leak detection capability for the leak-testing gas that is present in the vessels being leak-tested.

The leak detector 154 can be constructed and arranged so that it has the capability for (i) pumping down to vacuum pressure levels and (ii) upon achieving a predetermined vacuum pressure, actuating the leak detection capability of the device. In this mode, the leak detector may be actuated to pump down the chamber housing 114 by evacuating gas from the interior volume 116 of the housing and flowing it through the conduit 146 for discharge to the ambient environment of the system. After the chamber housing and conduit 146 have been evacuated to a predetermined pressure, the detection capability of the leak detector is activated, to sense and responsively produce an output correlative of the presence or absence of the leak-testing gas in the vacuum environment of the vessel being tested.

Alternatively, the chamber housing may be evacuated for leak testing by a separate, dedicated vacuum pump, and after the suitable vacuum level has been established in the environment of the vessel, communication of the leak detector to the vacuum environment is effected, so that the detector thereafter can sense and provide a corresponding output of presence or absence of the leak-testing gas in the vacuum environment.

To carry out the leak-testing method in the system of FIG. 1 using the dedicated vacuum pump 164, the system is arranged so that the chamber housing 114 is coupled in flow relationship by vacuum line 166 to vacuum pump 164. When the vacuum pump is actuated, the gas contents of the interior volume 116 of the chamber housing 114 are withdrawn to establish a vacuum condition in such interior volume, as well as the conduit 146 coupled therewith.

The leak detector 154 in such arrangement can be arranged to automatically turn on at the point at which the pump-down of the chamber housing 114 yields a selected pressure level, e.g., 10 torr, in the housing 114 and conduit 146. Alternatively, the leak detector can be turned on in accordance with a cycle time program, so that after a predetermined period of pumping to vacuum level, the leak detector is actuated to provide an output correlative of the presence or absence of the leak-testing gas.

In the arrangement shown in FIG. 2, the vacuum pump 164 is joined, via signal transmission line 168, to central processing unit (CPU) 160. The CPU 160 additionally is coupled to leak detector 154 by signal transmission line 162. The CPU can be of any suitable type, as for example a general purpose programmable computer, microprocessor, programmable logic controller, etc.

A gas package 118 is shown as disposed in the interior volume 116 of chamber housing 114. Such gas package comprises a cylindrically-shaped tank having a neck region 120 to which is joined a valve head assembly 122. The valve head assembly may include a flow control valve that is manually actuated by a user of the vessel, or alternatively, the valve head assembly can include a valve actuator that is automatically actuatable by the CPU or other control device to effect opening or closing of the valve therein.

The vessel for purposes of the leak testing may contain any suitable type of leak detector gas for which the system is effective to sense presence or absence of a leak from the vessel. Examples include, without limitation, rare gases, bulk gases, krypton, neon, xenon, argon, hydrogen, oxygen, helium, nitrogen, ammonia, arsine, phosphine, silane, acetylene, a halogen, a hydrogen halide, a boron halide; a hydrogen chloride, hydrogen bromide, chlorine, tungsten hexafluoride, hydrogen fluoride, carbon dioxide, nitrous oxide, nitrogen dioxide, dicholorosilane, trichlorosilane, carbonyl sulfide, sulfur hexafluoride, phosphine, arsine, disilane, chlorine trifluoride, boron trichloride, halogenated compounds, hydrocarbons, amines, or anorganometallic precursors. Halogenated compounds may include, for example, $CF_4$, $NF_3$, $CHClF_2$, $CClF_2CF_3$, $CClF_3$, $CHCl_2F$, $CH_2F_2$, and $CH_3F$. Hydrocarbons may include, for example, butadiene, ethane, ethylene, butane, butene, isobutane, propane, propylene, methylacetylene-propadiene ("MAP"), and methylacetylene-propadiene mixtures stabilized with alkane and alkene hydrocarbons. Amines may include, for example, triethylamine, dimethylamine and monoethylamine. Organometallic precursors may include, for example, trimethylgallium, trimethylaluminum, and trimethylindium. The leak detector gas used for testing the leak-tightness of the vessel thus may be of any appropriate type, and may be the same as, or alternatively different from, the gas or other material that is contained in the vessel in its normal intended use.

In one embodiment of the operation of the system illustratively shown and described with reference to FIG. 2, the vessel 118 is filled with a leak detection gas, e.g., helium, at suitable superatmospheric pressure, as for example pressure in a range of from about 300 to about 2000 pounds per square inch gauge (psig).

The vessel 118 after filling with the leak testing gas is placed in the housing chamber 114. The vacuum pump 164 then is actuated to withdraw the gas from interior volume 16 of the chamber housing 114 and conduit 146, until a predetermined pressure is reached. The leak detector 154 thereupon is actuated to sense gas leakage from the vessel, as flowing and/or diffusing through conduit 146 to the leak detector 154.

Since the housing chamber 114 in the practice of the invention as illustrated in FIG. 2 is evacuated to remove atmospheric gases therefrom prior to leak testing, the loss of sensitivity that has plagued prior art leak detection systems is eliminated. As a result, the detection limit of the leak testing operation has been found to be unexpectedly increased in magnitude, e.g., by a magnitude of 5 times higher than the detection limit that is achievable when leak testing is conducted in an ambient environment at atmospheric pressure.

As a specific example, in an ambient environment at atmospheric pressure, where helium is being used as the pressurizing gas for a vessel of the type described in U.S. Pat. No. 5,518,528, a leak detector can detect leakage only to levels on the order of about $1 \times 10^{-6}$ standard atmospheric-cc/sec (standard atmospheric-cc/sec being volumetric flow rate of gas at standard pressure and temperature (1 atmosphere, 25° C.) conditions; 1 atmospheric cc/sec=1.013 mBar-liter/sec). By contrast, the system and method of the present invention, utilizing a vacuum arrangement and leak detector with helium as the leak-detection gas, can readily achieve leak detection levels as low as $1 \times 10^{-11}$ standard atmospheric-cc/sec. This represents a five orders of magnitude improvement in the sensitivity of the leak detection system by the apparatus and method of the present invention. In addition, the apparatus and method of the invention as a result of such high sensitivity enable vessels to be identified that will be susceptible to problematic leakage in subsequent use.

The apparatus and method of the present invention thereby unexpectedly achieve a predictive utility, in the ability to identify vessels that are likely to develop problematic leakage in later use. Vessels that have been leak tested by currently conventional leak test methods and found to be leak-free nonetheless often develop leaks in the field, a fact that has frustrated quality assurance efforts to identify and reject such vessels at the manufacturing facility and/or gas fill site. This circumstance is due to the fact that many leaks are not detected by the conventional leak-testing, because they are below the detection limit of the conventional technique, but such extremely small leakages nonetheless often increase in magnitude after the shipment from the factory of the pressurized vessel containing material for subsequent dispensing, due to subsequent transportation, storage and installation effects such as vibration, thermal cycling, etc.

Generally, it has been determined that compressed gas cylinders that manifest leakage in the factory or fill site, which is less than $1\times10^{-8}$ standard atmospheric-cc/sec., do not normally manifest detectable leaks in the field. Accordingly, since the detection limits of the apparatus and method of the invention are substantially increased in relation to those of the prior art, to below such leakage level of $1\times10^{-8}$ standard atmospheric-cc/sec, the apparatus and method of the invention can easily detect such "future leakers," thereby dramatically decreasing the incidence of field leaks in vessels that have previously been qualified as suitable for pressurized gas service.

In general, the method and apparatus of the present invention are usefully employed to determine leakage levels that are significantly below those of conventional leak detection approaches. Current leak detection techniques in the art are able to detect leakages only down to the level of $1\times10^{-6}$ standard atmospheric-cc/sec. The present invention thus achieves a significant advance in the art by its leak detection capability below the conventional detection limit of $1\times10^{-6}$ standard atmospheric-cc/sec. The present invention permits the pass/fail leak rate criterion for acceptance or rejection of fluid containment products to be at a value in a suitable range appropriate to the specific products being qualified, e.g., a value in a range of from $1\times10^{-7}$ standard atmospheric-cc/sec to $1\times10^{-11}$ standard atmospheric-cc/sec. In a specific embodiment, the pass/fail value may be a value in a range of from $1\times10^{-7}$ standard atmospheric-cc/sec to $1\times10^{-9}$ standard atmospheric-cc/sec. For fluid dispensing vessels of the types described in aforementioned U.S. Pat. Nos. 5,518,528, 6,101,816 and 6,089,027, the disclosures of which hereby are incorporated herein by reference in their entireties, an appropriate pass/fail value in one embodiment of the invention is $1\times10^{-8}$ standard atmospheric-cc/sec, which is a detection value that provides good assurance that leaks will not develop in subsequent transport, storage and/or use, and at the same time is not so restrictive that it results in rejection of vessels that will be appropriately leak-free in such subsequent transport, storage and/or use.

Figure 3:
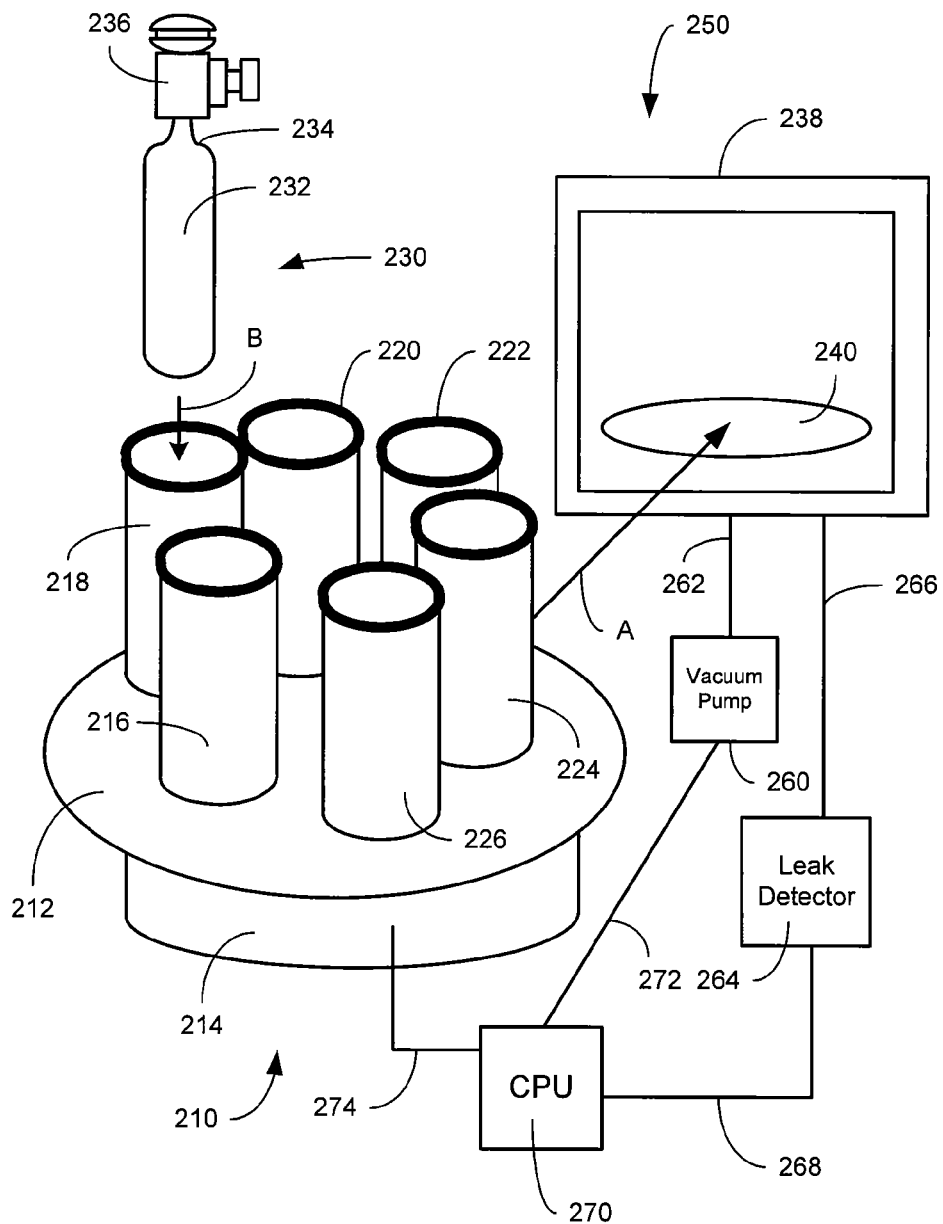

FIG. 3 is a schematic representation of a leak testing system according to another embodiment of the invention, as adapted for automated leak-testing of multiple vessels.

The leak detection system 200 shown in FIG. 3 provides the capability to automatically leak test multiple vessels, and includes a multi-vessel test assembly 210, including a support 212 of disk-like form, on which is mounted a series of cylindrical vacuum chambers 216, 218, 220, 222, 224 and 226. The support 212 is mounted on a motive structure 214, which may for example further include tracks, an extendible mechanical arm or other associated motive structure (not shown in FIG. 3), by which the multi-vessel test assembly 210 can be translated in the direction indicated by arrow A, into the vacuum housing 250.

The vacuum housing 250 includes an enclosure 238 having a support 240 therein, on which the multi-vessel test assembly 210 reposes, subsequent to its translation into the vacuum housing 250.

Prior to being translated into the vacuum housing 250, the multi-vessel test assembly 210 is loaded with the vessels to be leak-tested. Such loading may be carried out in a manual, automated, or semi-automated manner.

FIG. 3 illustratively shows a vessel 232 having a valve head assembly 236 attached to the neck 234 of the vessel, as it is inserted into cylindrical vacuum chamber 218 (in the direction indicated by arrow B).

The multi-vessel test assembly 210 in one embodiment is configured with a rotatable carousel that is rotated to permit an operator or loading machine (not shown) to insert a vessel pressurized with leak-testing fluid into each of the respective cylindrical vacuum chambers. After such filling, the multi-vessel test assembly 210 is translated into the enclosure 250 by the motive structure 214, and the enclosure is sealed, as for example by closure of a door, cover or other member of the enclosure. The enclosure then is pumped down to vacuum level, by means of a vacuum pumping capability of the leak detector 264 if such leak detector has integral pumping capability, or alternatively (or additionally) by means of the vacuum pump 260 joined to housing 250 by evacuation line 262. In this embodiment, the vacuum pump 260 is controlled by a central processor unit (CPU) 170 that transmits control signals to vacuum pump 260 by means of signal transmission line 172.

When the vacuum pump 260 has operated to effect the appropriate vacuum condition in the housing 250, each of the vessels in turn is tested. For this purpose, each of the cylindrical vacuum chambers 216, 218, 220, 222, 224 and 226 may have detachable covers that are maintained in a sealed state in all but one cylindrical chamber, which is opened for the leak-test of the associated vessel in such vacuum chamber while all other vacuum chambers are maintained in sealed condition, and with each of the respective vessels in turn being exposed to vacuum within the housing 250 and subjected to leak testing.

For this purpose, the housing 250 may contain a suction head (not shown) or other structure that selectively engages each of the vacuum chambers in turn and exposes the vessels therein sequentially to the vacuum test condition.

During the exposure to vacuum of a given single vessel, the leak detector 264 is actuated by the CPU 270, by a control signal transmitted to the leak detector 264 in transmission line 168, to actuate the leak detection process.

As shown in FIG. 2, the CPU may also be coupled in controlling relationship to motive structure 214 by signal transmission line 274.

By this integrated control arrangement the CPU can be actuated to translate the assembly 210 into the evacuation enclosure 250 after each of the vacuum chambers 216, 218, 220, 222, 224 and 226 is filled with a pressurized vessel. Once the assembly of vessels to be leak tested is reposed in the enclosure 250, the CPU actuates the closure and sealing of the housing 250, and then actuates the vacuum pump 260 to pump down the enclosure 250 or a sampling region therein coupled with a given cylindrical vacuum chamber, to create vacuum conditions suitable for leak testing, with the CPU concurrently actuating the leak detector 264 so that the leak detector senses any gas leakage from the vessel being tested.

In this manner, the system shown in FIG. 3 is automated to impose vacuum conditions on the vessel being leak tested and to detect any leakage event, in a highly efficient and reproducible manner.

Figure 4:
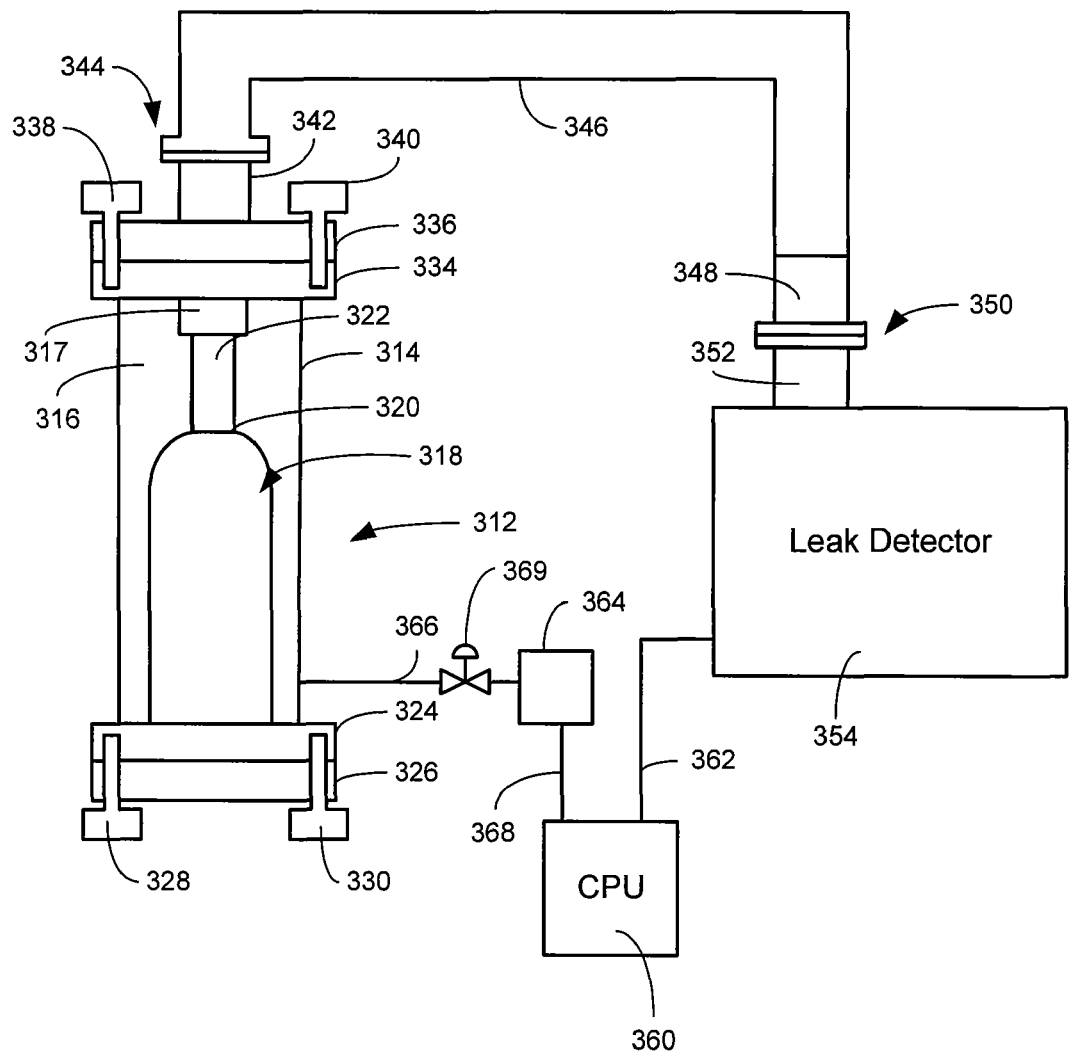

FIG. 4 is a schematic view of a leak detection system according to one embodiment of the present invention. The illustrated leak-testing system 310 includes chamber 312 including chamber housing 314 circumscribing an enclosed interior volume 316 between flange elements at lower and upper ends of the housing. The lower end of the housing is bounded by a flange assembly including upper flange 324, lower flange 326 and screw-type mechanical fasteners 328 and 330 interconnecting such flanges. The upper flange 324 of such assembly may be brazed, welded, soldered or otherwise secured to the chamber housing 314, and advantageously is of a same size as the lower flange 326, so as to facilitate mating and engagement of such flanges to form the flange assembly. A fluid dispensing vessel 318 is contained in the interior volume 316 of the chamber housing 314, having a neck 320 to which is joined a valve head 322, joined in turn to the vacuum head 317 to form a leak-tight fitting through which the interior volume of the vessel 318 can be evacuated by vacuum pumping.

Joined in flow communication to the chamber housing 314, by flow line 366 containing flow control valve 369 therein, is a source 364 of leak-testing fluid. The leak-testing fluid source 364 may be a vessel or container holding the leak-testing fluid at appropriate pressure, so that it is flowable to the interior volume 316 of the chamber housing 314 to fill the interior volume with an environment of leak-testing fluid surrounding the vessel to be tested for leak-tightness.

The chamber housing 314 at its upper end has a flange 334 secured thereto, and matably engagable with flange 336, so that the respective flanges can be secured in position by screw-type mechanical fasteners 338 and 340, as shown.

In the flange assembly including upper flange 334 and lower flange 336, the upper flange has a port extension 342 secured thereto. The port extension 342 terminates in a flange that is matably engaged with a complimentary flange of the conduit 346. By this arrangement, the respective flanges of the port extension and conduit form a flange assembly 344. This flange assembly may be mechanically interlocked in a conventional or otherwise known manner, e.g., by a collar clamp, or by interconnecting bolt and nut assemblies, or in other appropriate manner.

The port extension 342 is coupled through flanges 334 and 336 with a vacuum head 317, by which the vessel 318 in chamber 312 can be evacuated, as hereinafter more fully described.

The conduit 346 at its opposite end from the flange assembly 344 is secured to a terminal section 348, such as by welding, brazing, soldering, bonding, or use of mechanical fasteners. The terminal section 348 of conduit 346 terminates in a flange that is matably engageable with a complimentary flange of the port extension 352, thereby forming a flange assembly 350. Such flange assembly also can be mechanically interlocked in a conventional or otherwise known manner, e.g., by a collar clamp, or by interconnecting bolt and nut assemblies, or in other appropriate manner.

The port extension 352 is coupled with leak detector 354. The leak detector 354 may be of any suitable type, having leak detection capability for the leak-testing gas that is present in the vessels being leak-tested.

The leak detector 354 can be constructed and arranged so that it has the capability for (i) pumping down to vacuum pressure levels and (ii) upon achieving a predetermined vacuum pressure, actuating the leak detection capability of the device. In this mode, the leak detector may be actuated to pump down the vessel 318 by evacuating gas from the interior volume of the vessel and flowing it through the vessel valve head 322, vacuum head 317 joined leak-tightly to the vacuum head, and conduit 346, for discharge to the ambient environment of the system. After the vessel and conduit 346 have been evacuated to a predetermined pressure, and sufficient volume of leak-testing fluid has been flowed into the chamber housing 314 from the source 364 in line 366 (with valve 369 being open), the detection capability of the leak detector is activated, to sense and responsively produce an output correlative of the presence or absence of the leak-testing gas in the vacuum environment in the vessel being tested.

Alternatively, the vessel may be evacuated for leak testing by a separate, dedicated vacuum pump, and after the suitable vacuum level has been established in the interior of the vessel, communication of the leak detector to the vacuum in the vessel interior is effected, so that the detector thereafter can sense and provide a corresponding output of presence or absence of the leak-testing gas in the interior vacuum environment of the vessel.

To carry out the leak-testing method in the system of FIG. 4, leak-testing fluid is flowed into the housing 314 from source 364 in line 366, as described above. When the vacuum pump is actuated, the gas contents of the interior volume of the vessel 318 are withdrawn to establish a vacuum condition in such interior volume, as well as the conduit 346 coupled therewith.

The leak detector 354 in such arrangement can be arranged to automatically turn on at the point at which the pump-down of the vessel interior volume yields a selected pressure level, e.g., 10 torr, within the vessel 318 and conduit 346. Alternatively, the leak detector can be turned on in accordance with a cycle time program, so that after a predetermined period of pumping to vacuum level, the leak detector is actuated to provide an output correlative of the presence or absence of the leak-testing gas leakage into the vessel.

In the arrangement shown in FIG. 4, the leak-testing fluid source 364 is joined, via signal transmission line 368, to central processing unit (CPU) 360. The CPU 360 additionally is coupled to leak detector 354 by signal transmission line 362. The CPU can be of any suitable type, as for example a general purpose programmable computer, microprocessor, programmable logic controller, etc. for carrying out the leak-testing operation in accordance with a cycle time program, or in other automated manner. For example, the flow control valve 369 may be responsive to the control signal sent to source 364, so that the fluid is dispensed to the chamber housing interior volume 316 in a controlled or sequential manner, with respect to other steps of the leak-testing procedure.

The vessel for purposes of the leak testing may be exteriorly exposed to any suitable type of leak detector gas for which the system is effective to sense presence or absence of a leak into the vessel. Examples include, without limitation, hydrogen, oxygen, helium, nitrogen, ammonia, arsine, phosphine, silane, boron trifluoride, boron trichloride, acetylene, and chlorine. The leak detector gas used for testing the leak-tightness of the vessel thus may be of any appropriate type, and may be the same as, or alternatively different from, the gas or other material that is contained in the vessel in its normal intended use.

In one embodiment of the operation of the system illustratively shown and described with reference to FIG. 4, the vessel 318 is exposed to a leak detection gas, e.g., helium, at suitable superatmospheric pressure, as for example pressure in a range of from about 300 to about 2000 pounds per square inch gauge (psig).

The vessel 318 initially is placed in the housing chamber 314 and coupled to the vacuum head 317 at the valve head 322 of the vessel. The chamber housing then is filled to a desired extent with the leak-testing fluid from source 364, and valve 366 then is closed. The vacuum pump in the leak detector 354 then is actuated to withdraw the gas from the interior volume of the vessel, until a predetermined vacuum level is reached. The leak detector 354 thereupon is actuated to sense gas leakage into the vessel, as flowing and/or diffusing through conduit 346 to the leak detector 354.

Since the vessel is evacuated to remove atmospheric gases therefrom prior to leak testing, the loss of sensitivity that has plagued prior art leak detection systems is eliminated. As a result, the detection limit of the leak testing operation is increased in magnitude, relative to the detection limit that is achievable when leak testing is conducted in an ambient environment at atmospheric pressure.

The apparatus and method of the invention as a result of such high sensitivity enable vessels to be identified that will be susceptible to problematic leakage in subsequent use.

The apparatus and method of the present invention thereby unexpectedly achieve a predictive utility, in the ability to identify vessels that are likely to develop problematic leakage in later use. Vessels that have been leak tested by currently conventional leak test methods and found to be leak-free nonetheless often develop leaks in the field, a fact that has frustrated quality assurance efforts to identify and reject such vessels at the manufacturing facility and/or gas fill site. This circumstance is due to the fact that many leaks are not detected by the conventional leak-testing, because they are below the detection limit of the conventional technique, but such extremely small leakages nonetheless often increase in magnitude after the shipment from the factory of the pressurized vessel containing material for subsequent dispensing, due to subsequent transportation, storage and installation effects such as vibration, thermal cycling, etc.

Generally, it has been determined that compressed gas cylinders that manifest leakage in the factory or fill site, which is less than $1 \times 10^{-8}$ standard atmospheric-cc/sec., do not normally manifest detectable leaks in the field. Accordingly, since the detection limits of the apparatus and method of the invention are substantially increased in relation to those of the prior art, to below such leakage level of $1 \times 10^{-8}$ standard atmospheric-cc/sec, the apparatus and method of the invention can easily detect such "future leakers," thereby dramatically decreasing the incidence of field leaks in vessels that have previously been qualified as suitable for pressurized gas service.

In general, the method and apparatus of the present invention are usefully employed to determine leakage levels that are significantly below those of conventional leak detection approaches. Current leak detection techniques in the art are able to detect leakages only down to the level of $1 \times 10^{-6}$ standard atmospheric-cc/sec. The present invention thus achieves a significant advance in the art by its leak detection capability below the conventional detection limit of $1 \times 10^{-6}$ standard atmospheric-cc/sec. The present invention permits the pass/fail leak rate criterion for acceptance or rejection of fluid containment products to be at a value in a suitable range appropriate to the specific products being qualified, e.g., a value in a range of from $1 \times 10^{-7}$ standard atmospheric-cc/sec to $1 \times 10^{-11}$ standard atmospheric-cc/sec. In a specific embodiment, the pass/fail value may be a value in a range of from $1 \times 10^{-7}$ standard atmospheric-cc/sec to $1 \times 10^{-9}$ standard atmospheric-cc/sec. For fluid dispensing vessels of the types described in aforementioned U.S. Pat. Nos. 5,518,528, 6,101,816 and 6,089,027, the disclosures of which hereby are incorporated herein by reference in their entireties, an appropriate pass/fail value in one embodiment of the invention is $1 \times 10^{-8}$ standard atmospheric-cc/sec, which is a detection value that provides good assurance that leaks will not develop in subsequent transport, storage and/or use, and at the same time is not so restrictive that it results in rejection of vessels that will be appropriately leak-free in such subsequent transport, storage and/or use.

In operation of the FIG. 4 system, the leak detector can be calibrated in any suitable manner, such as for example by a calibration standard, e.g., a source of leak detector calibration gas in a container that releases the calibration gas at a controlled accurate leak rate, so that the leak detector can be accurately calibrated by reference thereto. More than one calibration standard can be employed, to ensure that the leak detector is appropriately calibrated for subsequent leak detection operation.

It will be appreciated that in lieu of an arrangement in which the vacuum pump and leak detector are consolidated in an integrated, unitary leak detector and vacuum pump assembly as shown in FIG. 4, separate leak detector and vacuum pump components can alternatively be employed in the system.

Figure 5:
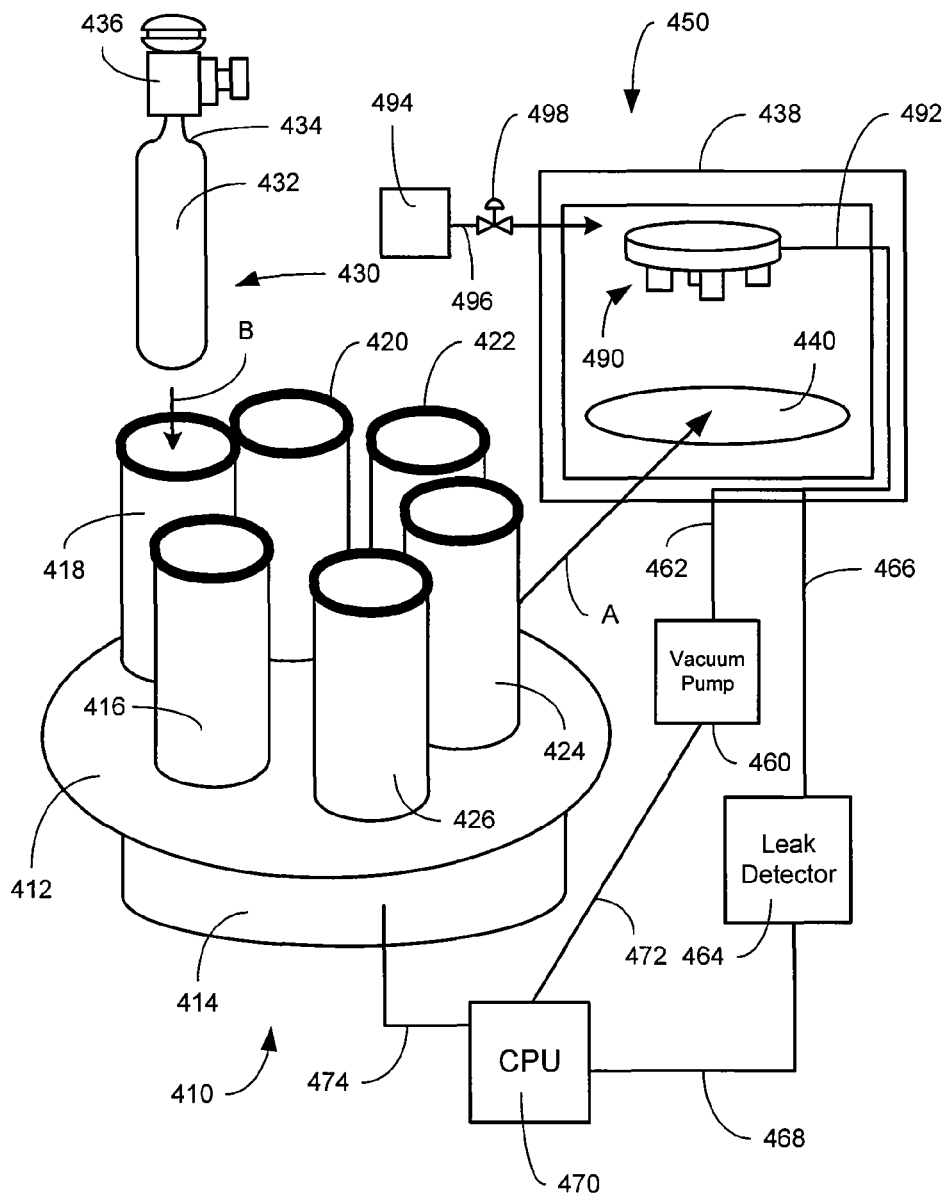

FIG. 5 is a schematic representation of a leak testing system according to another embodiment of the invention, as adapted for automated leak-testing of multiple vessels.

The leak detection system 400 shown in FIG. 5 provides the capability to automatically leak test multiple vessels, and includes a multi-vessel test assembly 410, including a support 412 of disk-like form, on which is mounted a series of cylindrical chambers 416, 418, 420, 422, 424 and 426. The support 412 is mounted on a motive structure 414, which may for example further include tracks, an extendible mechanical arm or other associated motive structure (not shown in FIG. 5), by which the multi-vessel test assembly 410 can be translated in the direction indicated by arrow A, into the housing 450.

The housing 450 includes an enclosure 438 having a support 440 therein, on which the multi-vessel test assembly 410 reposes, subsequent to its translation into the housing 450. The housing also includes a vacuum head 490, which is joined to vacuum and leak detection line 492, whereby the multiple vessels can be evacuated to suitable vacuum levels by action of the pump 460, joined by pump line 462 to the vacuum and leak detection line 492. The vacuum and leak detection line 492 is also joined to the leak detection line 466 associated with leak detector 464.

Prior to being translated into the vacuum housing 450, the multi-vessel test assembly 410 is loaded with the vessels to be leak-tested. Such loading may be carried out in a manual, automated, or semi-automated manner.

FIG. 5 illustratively shows a vessel 432 having a valve head assembly 436 attached to the neck 434 of the vessel, as it is inserted into cylindrical chamber 418 (in the direction indicated by arrow B).

The multi-vessel test assembly 410 in one embodiment is configured with a rotatable carousel that is rotated to permit an operator or loading machine (not shown) to insert a vessel into each of the respective cylindrical chambers. After such filling, the multi-vessel test assembly 410 is translated into the enclosure 450 by the motive structure 414, and the enclosure is sealed, as for example by closure of a door, cover or other member of the enclosure. The enclosure then is filled with leak-testing gas from source 494 thereof, as joined to the enclosure 450 by feed line 496 containing flow control valve 498 therein, and the vessels are connected to the vacuum head 490 and the vacuum pump is actuated to pump the vessels down to vacuum level, by means of the vacuum pump 460 joined to vacuum and leak detection line 492 in housing 450 via the evacuation line 462. In this embodiment, the vacuum pump 460 is controlled by a central processor unit (CPU) 470 that transmits control signals to vacuum pump 460 by means of signal transmission line 472.

When the vacuum pump 460 has operated to effect the appropriate vacuum condition in the vessels in housing 450, each of the vessels in turn is tested in the respective cylindrical chamber 416, 418, 420, 422, 424 and 426.

During the exposure to vacuum of a given single vessel, the leak detector 464 is actuated by the CPU 470, by a control signal transmitted to the leak detector 464 in transmission line 468, to actuate the leak detection process.

As shown in FIG. 5, the CPU may also be coupled in controlling relationship to motive structure 414 by signal transmission line 474.

By this integrated control arrangement the CPU can be actuated to translate the assembly 410 into the evacuation enclosure 450 after each of the chambers 416, 418, 420, 422, 424 and 426 is filled with a pressurized vessel. Once the assembly of vessels to be leak tested is reposed in the enclosure 450, the CPU actuates the closure and sealing of the housing 450, and the enclosure is filled with leak-testing fluid from source 494, and then the CPU 470 actuates the vacuum pump 460 to pump down the vessels in the enclosure 450, to create vacuum conditions suitable for leak testing, following which the CPU actuates the leak detector 464 so that the leak detector senses any gas leakage into the vessel being tested.

In this manner, the system shown in FIG. 5 is automated to impose vacuum conditions on the vessel being leak tested and to detect any leakage event, in a highly efficient and reproducible manner.

It will be appreciated that the apparatus and method of the invention may be utilized in respect of any structures, structural members, packaging, vessels, fluid containment devices, etc. that must maintain leak-tightness in use.

The advantages and features of the invention are further illustrated with reference to the following example, which is not to be construed as in any way limiting the scope of the invention but rather as illustrative of one embodiment of the invention in a specific application thereof.

Example 1

Inboard helium leak checking of SDS3 or 2.2 L VAC cylinders (ATMI, Inc., Danbury, Conn., USA) is carried out by the following procedure.

A system of the type shown schematically in FIG. 2 is employed. The leak detector is an Alcatel ASM 142 helium leak detector which displays leak rate and system vacuum. The leak detector is actuated by switching the main power toggle switch to the "ON" position. The leak detector will then automatically begin start-up checks and then perform a self-calibration.

When the leak detector successfully completes start-up and calibration procedures, an audible message will announce the system is ready for testing and the leak detector display will indicate, "Ready for Testing". At this point the cycle button is depressed to initiate a test.

The inboard test port of the helium leak detector is connected by a stainless steel bellows line to the inlet of the leak test chamber. The leak detector is calibrated with a certified helium leak rate using a calibrated leak standard that is sealed in the test chamber after the leak test valve is opened.

After sealing the test chamber with the test chamber flange, the "cycle" button on the Alcatel ASM 142 is depressed to initiate the chamber calibration test. After successful pump down of the system, the helium reading is observed on the leak detector display. After a stable reading is achieved, the chamber calibration leak test reading is determined to be within 5% of the stated certified calibration. After calibration of the chamber, the cycle button on the leak detector is pressed to vent the leak chamber to atmospheric pressure. The flange bolts on the chamber then are loosened and the chamber flange is removed. Next, the helium certified leak standard is removed from the chamber, and the leak valve is closed.

The cylinder leak testing then is conducted according to the following test procedure:

Step 1: Pressurize the cylinder to be tested with 300 PSIG of 100% ultra-high purity helium. Place the helium filled cylinder to be tested into the leak test chamber and seal the inlet opening flange.

Step 2: Initiate the leak test cycle by depressing the "cycle" button on the leak detector. The leak detector will proceed to pump down the leak test chamber until a sufficient vacuum is reached for leak testing.

Step 3: After the leak detector commences helium leak detection, wait five minutes for the helium signal to stabilize.

Step 4: Observe the magnitude of the leak by viewing leak detector display. A helium signal greater than $1.013 \times 10^{-8}$ mbar-l/sec is considered a leak. Record the leak test result next to the serial number tested on the cylinder lot traveler. If the cylinder fails the leak test it may be retested. In the case of a retest, the chamber is vented by pressing the cycle button on the leak detector and then a second test is performed as before. If the cylinder fails to meet the leak test requirements on the second test, the cylinder is rejected and is removed from the lot of acceptable cylinders.

Step 5: Upon completion of the leak check the leak test chamber is vented by depressing the "cycle" button on the leak detector. The cylinder may be safely removed and another cylinder tested.

Example 2

A valved empty cylinder is connected to an Alcatel ASM-142 helium leak detector. The unit has a helium sensitivity that can be related to a minimum leak rate detection limit of $1 \times 10^{-9}$ cc He/sec when gas is introduced into the unit. The unit obtains the sample by subjecting the feed line to a vacuum and drawing in the sample. The feed line is connected to the cylinder, so that the entire cylinder is subjected to the vacuum capability of $1 \times 10^{-6}$ ton. While subject to a vacuum, helium gas is introduced in a controlled manner to various potential leak points or threaded connections on the external valve (helium gas is free-flowed over the test area). The vacuum in the cylinder draws in the helium through any leak sites, and the unit detects and measures the helium strength of entry. The strength of entry can be equated to a leak rate. By controlling the helium gas exposure to the valve, a specific leak rate can be assigned to each valve component area measured.

In another embodiment of the invention, an apparatus to characterize leaks in a fluid storage container is provided. The apparatus may include a valve coupler and a gas manifold. Some embodiments may also include a processor. The valve coupler may couple the apparatus with a closed valve on the fluid storage container. The gas manifold may be coupled with the valve coupler, where the gas manifold includes a first branch connected with a gas monitoring device. The gas monitoring device may scan for a plurality of gases that may be emitted by the closed valve of the fluid storage container. The processor may be operable to receive gas monitoring device data representing masses for one or more of the plurality of gases detected by the monitor.

In some embodiments, the valve coupler may include an outlet connector for a compressed gas valve and/or the fluid storage container may include a high pressure gas cylinder. In these or other embodiments, the gas manifold may also include a second branch connected with a manifold pump to evacuate the manifold. The gas manifold may also have a third branch connected with a pressure measuring device to measure the gas pressure in the manifold. In some embodiments the gas monitoring device may include a mass spectrometer that scans a mass range from about 1 atomic mass unit to about 400 atomic mass units.

In some embodiments the processor may perform other functions. For example, the processor may be operable to generate a mass spectrum from the data representing masses for one or more of the plurality of gases detected by the monitor. In some of these embodiments, the processor may be in communication with a display that may be able to display the mass spectrum. In some embodiments, the processor may be operable to calculate leak rates for one or more of the plurality of gases. In some of these embodiments, the processor may be in communication with a display that can display the leak rates for one or more gases. The leak rates may possibly be displayed in units of cubic centimeters per second.

In another embodiment of the invention, a system to characterize leaks in a fluid storage container is provided. The system may include an evacuatable chamber and a gas manifold. Some embodiments may also include a processor. The evacuatable chamber may store the fluid storage container. The gas manifold may be coupled with the evacuatable chamber, where the gas manifold includes a first branch connected with a gas monitoring device. The gas monitoring device may scan for a plurality of gases that may be emitted by the fluid storage container. The processor may be operable to receive gas monitoring device data representing masses for one or more of the plurality of gases detected by the monitor.

In some embodiments, the evacuatable chamber may be coupled with a chamber vacuum pump to evacuate gases from the chamber. In these and other embodiments, the evacuatable chamber may be coupled with a chamber pressure monitor to measure and display gas pressure in the chamber. In some embodiments, the gas manifold may also include a second branch connected with a manifold pump to evacuate the manifold. The gas manifold may also have a third branch connected with a pressure measuring device to measure the gas pressure in the manifold. In some of these embodiments, the gas monitoring device may include a mass spectrometer that scans a mass range from about 1 atomic mass unit to about 400 atomic mass units.

In another embodiment of the invention, a method to characterize a leak in a fluid storage container is provided. The method may include a step of connecting a valve on the fluid storage container with a leak characterization apparatus. The leak characterization apparatus may include a gas manifold, where the manifold is in fluid communication with a valve coupler that connects with the valve on the container and a gas monitoring device. The method may further include a step of evacuating the gas manifold. The method may also include scanning the evacuated manifold with the gas monitoring device for a plurality of gases that may be emitted by the fluid storage container. The method may moreover include a step of generating leak characterization data about one or more of the plurality of gases. The monitoring device may scan a mass range from about 1 atomic mass unit to about 400 atomic mass units. The characterization data may include a mass spectrum of the plurality of gases emitted by the fluid storage container.

In some embodiments, the method may also include sending leak characterization data to a processor operable to calculate leak flow rates for the one or more gases on a display in electronic communication with the processor. In these or other embodiments, the method may further include displaying the leak flow rates for the one or more gases on a display in electronic communication with the processor. In some embodiments, the method may moreover include pressurizing the fluid storage container with a leak testing fluid before connecting the container with the leak characterization apparatus. The leak testing fluid may be compressed air, hydrogen, oxygen, helium, nitrogen, ammonia, arsine, phosphine, silane, acetylene, a halogen, a hydrogen halide, or a boron halide.

In another embodiment of the invention, a method to characterize a leak in a fluid storage container is provided. The method may include a step of placing the fluid storage container in an evacuatable chamber fluidly coupled with a gas monitoring device. The gas monitoring device may scan a mass range from about 1 atomic mass unit to about 400 atomic mass units. The method may also include evacuating the chamber and scanning the chamber with the gas monitoring device for a plurality of gases that may be emitted by the fluid storage container. The method may further include a step of generating leak characterization data about one or more of the plurality of gases. The characterization data may include a mass spectrum of the plurality of gases emitted by the fluid storage container.

In some embodiments, the method may further include sending the leak characterization data to a processor operable to calculate leak flow rates for one or more of the plurality of gases. In these embodiments, the method may also include displaying the leak flow rates for the one or more gases on a display in electronic communication with the processor. In certain embodiments, the method may also include pressurizing the fluid storage container with a leak testing fluid be for placing the container in the evacuatable chamber.

In another embodiment of the invention, an apparatus for determining a leak rate of a gas from a closed valve is provided. The apparatus may include a vacuum pump, a pressure measuring device, a monitoring device, and a computer.

The vacuum pump may be configured to couple with a downstream side of the closed valve, wherein the downstream side of the closed valve is characterized by a pressure, and decrease the pressure of the downstream side of the closed valve. In some embodiments, the closed valve may have an upstream side characterized by the presence of the gas in a high pressure state.

The pressure measuring device may be configured to couple with the downstream side of the closed valve, and determine the pressure of the downstream side of the closed valve. The pressure measuring device may, in some embodiments, be a manometer configured to communicate with the computer.

The monitoring device may be configured to couple with the downstream side of the closed valve, and monitor a gas on the downstream side of the closed valve. The monitoring device may, in some embodiments, be a mass spectrometer configured to communicate with the computer. The gas may be characterized by a mass of the gas that is emitted from the closed valve, and the monitoring device may be configured to determine the mass of the emitted gas. The emitted gas may include atoms or molecules that can be detected by the monitoring device.

In some embodiments, the monitoring device may further be configured to couple with a calibration gas leak source having a certain leak rate. The monitoring device may monitor a calibration gas from the calibration gas leak source, where the calibration gas is characterized by a mass of gas. The monitoring device may then determine the mass of the calibration gas. In these or other embodiments, the computer may further be configured to store a value representative of the certain leak rate, where the value is based at least in part on the mass of the calibration gas.

The computer may be configured to control the vacuum pump based at least in part on the pressure, and determine the leak rate of the gas based at least in part on the concentration of the emitted gas. Determining the leak rate of the gas may include comparing the concentration of the emitted gas to at least one stored value representative of at least one certain leak rate. In some embodiments, determining the leak rate may be further based at least in part on the pressure of the downstream side of the closed valve. The computer may also be configured to report to a user the determined leak rate of the gas in units of cubic centimeters per second.

In some embodiments, the apparatus may also include an evacuation pump. In various embodiments, the evacuation pump may be configured to decrease the pressure of the downstream side of the closed valve to about 1 Torr, and the vacuum pump may be configured to decrease the pressure of the downstream side of the closed valve to less than about 1 Torr.

In some embodiments, the computer may further be configured to control the evacuation pump based at least in part on the determination of the pressure of the downstream side of the closed valve. Controlling the evacuation pump and the vacuum pump based at least in part on the determination of the pressure of the downstream side of the closed valve may include activating the evacuation pump until the pressure of the downstream side of the valve is decreased to about 1 Torr, then deactivating the evacuation pump and activating the vacuum pump.

In another embodiment of the invention, another apparatus for determining a leak rate of a gas from a closed valve is provided. The apparatus may include a means for decreasing a pressure of a downstream side of the closed valve; a means for measuring the pressure of the downstream side of the closed valve; a means for controlling the means for decreasing the pressure of the downstream side of the closed valve based at least in part on the pressure; a means for determining the concentration of a gas on the downstream side of the closed valve; and a means for determining the leak rate of the gas based at least in part on the determined concentration.

In some embodiments, the apparatus may also include a means for storing at least one value representative of at least one certain leak rate. In these and other embodiments, the means for determining the leak rate may include means for comparing the determined concentration to the at least one stored value representative of the at least one certain leak rate. In some embodiments, the means for determining the leak rate of the gas may further be based at least in part on the pressure of the downstream side of the closed valve. Some embodiments may also include a means for reporting to a user the determined leak rate of the gas in units of cubic centimeters per second.

In another embodiment of the invention a method of determining a leak rate of a gas from a closed valve is provided. The method may include decreasing the pressure of a downstream side of the closed valve; determining the pressure of the downstream side of the closed valve; monitoring a gas on the downstream side of the closed valve, wherein the gas is characterized by a concentration and a molecular mass; and determining the leak rate of the gas based at least in part on the concentration or the molecular mass of the gas.

In some embodiments the method may also include storing at least one value representative of at least one certain leak rate, and determining the leak rate of the gas may include comparing the mass of the particles to the at least one stored value representative of the at least one certain leak rate. Determining the leak rate of the gas in these or other embodiments may also be based at least in part on the pressure of the downstream side of the closed valve. Some of the methods of the inventions may further include reporting to a user the determined leak rate of the gas in units of cubic centimeters per second.

In another embodiment, a method to characterize a leak in a fluid storage container is provided. The method may include placing the fluid storage container in an evacuatable chamber fluidly coupled with a gas monitoring device, evacuating the chamber, introducing a first reactive fluid into the chamber, wherein the first reactive fluid reacts with a fluid that may be emitted by the fluid storage container to produce particles, scanning the chamber with the gas monitoring device for a plurality of gases that may be emitted by the fluid storage container, evacuating fluid from the chamber and scanning the evacuated fluid with a particle counter, and generating leak characterization data about one or more of the plurality of gases based at least in part on data from the gas monitoring device and data from the particle counter.

In some embodiments, the first reactive fluid may include oxygen, and the particles may be oxides created by the reaction of the oxygen with the fluid leaking from the fluid storage container. Other reactive fluids, known in the art, may also be used as the first reactive fluid to make particles with the leaking fluid. In some embodiments, the first reactive fluid may be selected specifically for it's reactivity to the subject fluid held within the container to be tested. In some embodiments, the method may further include introducing a second reactive fluid to the particles, wherein the second reactive fluid may bond with the particles to make at least a portion of the particles larger. The second reactive fluid may be any fluid known in the art for enlarging the size of a particle, and in some instances may be selected for it's compatibility with the particles that will be produced by the leaking fluid and the first reactive fluid. Larger particles may allow less sensitive particle counters to be employed to produce the same overall system accuracy, or increase the overall system accuracy given a certain particle counter.

In another embodiment, another method to characterize a leak in a fluid storage container is provided. The method may include placing the fluid storage container in an evacuatable chamber fluidly coupled with a gas monitoring device, evacuating the chamber, introducing a first reactive fluid into the chamber, wherein the first reactive fluid reacts with a fluid that may be emitted by the fluid storage container to produce particles, evacuating fluid from the chamber and scanning the evacuating fluid with a particle counter, and generating leak characterization data about one or more of the plurality of gases based at least in part on data from the particle counter. In some embodiments, a second reactive fluid may also be introduced as discussed above.

Figure 6:
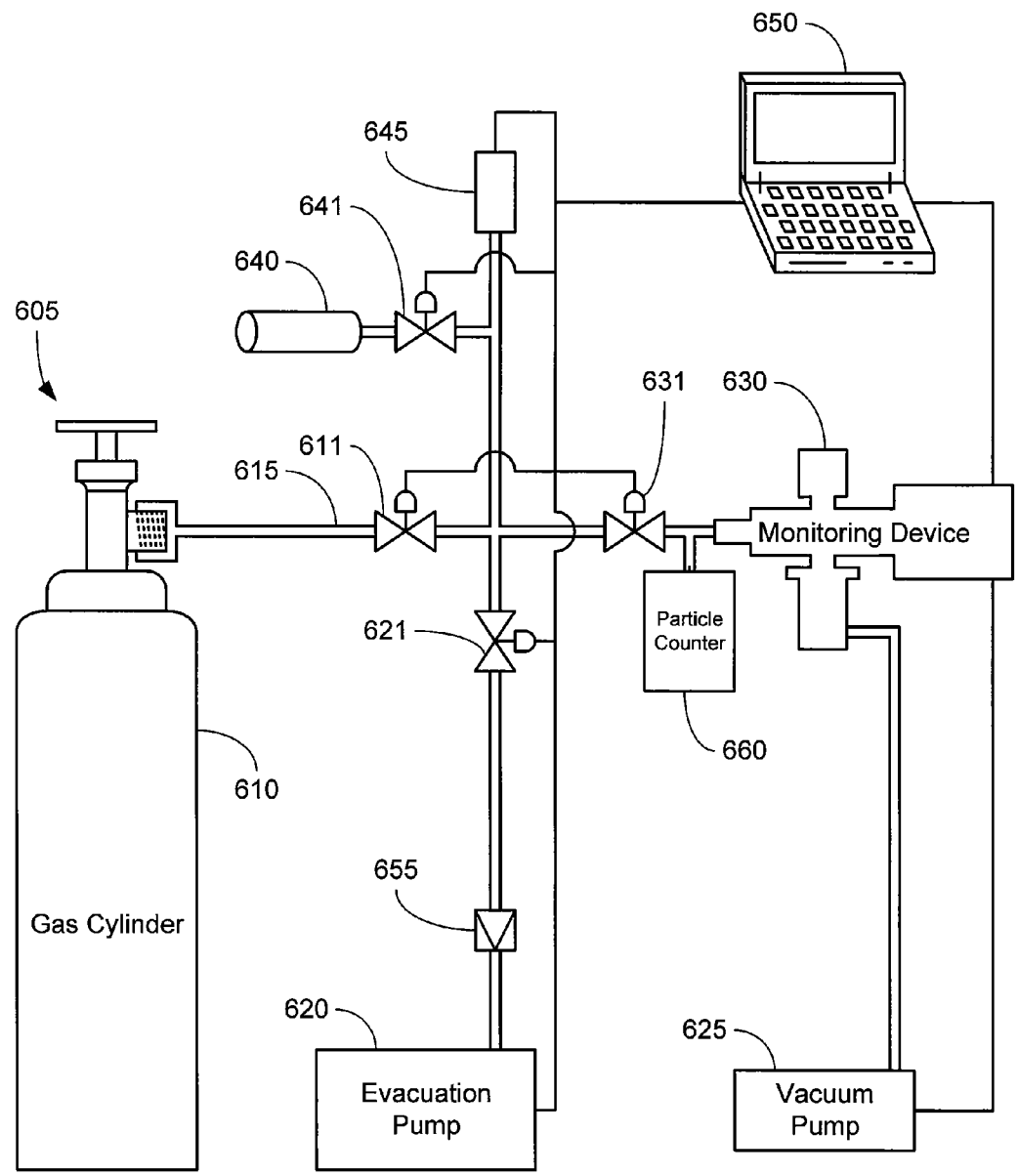

FIG. 6 shows an apparatus 600 for characterizing leaks in a fluid storage container, possibly including determining a leak rate of a gas from a closed valve 605. Though valve 605 is shown coupled with a gas cylinder 610, valve 605 may be coupled to other storage devices, flow devices, and/or other systems in other embodiments. Valve 605 may be coupled with a tubing system 615. Tubing system 615 may be any system known in the art for connecting together fluid utilizing, management, and/or monitoring equipment, including a valve coupler, gas manifold, or evacuatable chamber. Tubing system 615 may be coupled to various other components including an evacuation pump 620, a vacuum pump 625, a monitoring device 630, a calibration gas leak source 640, and a pressure measuring device 645 (also referred to herein as a chamber pressure monitor). In some embodiments, pressure measuring device 645 may be a manometer. In these or other embodiments, monitoring device 630 may include a mass spectrometer. The upstream side of valve 605, in this example, is the inside of gas cylinder 610. The downstream side of valve 605, in this example, is the inside of tubing system 615.

Remotely controlled valves 611, 621, 631, 641 may selectively isolate various components coupled with the tubing system. The valves may, for example, be pneumatic or electronically controlled solenoid valves. In other embodiments, remotely controlled valves 611, 621, 631, 641 may be manually controlled. Also shown in FIG. 6 is a vacuum sentry valve 655. Vacuum sentry valve 655 may prevent oil and/or other material from evacuation pump 620 from contaminating other system components should evacuation pump 620 fail during operations causing pressure to rapidly increase in tubing system 615.

Apparatus 600 may also include a computer 650. The computer may be any processor known in the art and may be in communication with various components of apparatus 600, including evacuation pump 620, monitoring device 630, pressure measuring device 645 and remotely controlled valves 611, 621, 631, 641. Though in FIG. 6, computer 650 is shown as a laptop computer, in some embodiments, computer 650 may be another type of device such as a notebook computer, desktop computer, or handheld computer.

In use, a user may couple calibration gas leak source 640 which contains gas 'A,' to tubing system 615. The user may then instruct computer 650 to initiate the calibration process for gas 'A.' In response, computer 650 may open remote valves 621, 631 and close remote valves 611,641. Evacuation pump 620 may be activated, and may decrease the pressure of tubing system 615 to about 1 Torr, or possibly lower. Gas 'A' may flow to monitoring device 630. The gas may contain particles, which may be atoms and/or molecules, and monitoring device 630 may determine the mass of the particles of the calibration gas. Computer 650 may thereafter store a value representative of the leak rate corresponding to calibration leak source 640 which may be based at least in part on the mass of the particles of the calibration gas.

In this example, if gas cylinder 610 contains gas 'A,' the user may wish to determine if, and how much, closed valve 605 is leaking. The user may couple valve 605 to tubing system 615. The user may instruct computer 650 to begin testing for a leak of gas 'A.' Computer 650 may then open remote valves 611, 621 and close remote valves 631, 641. Computer 650 may then instruct evacuation pump 620 to decrease the pressure of tubing system 615 on the downstream side of valve 605 to about 1 Torr. The computer may receive a measurement of the pressure inside tubing system 615 from pressure measuring device 645. Once the pressure of the downstream side is at some predetermined pressure, for example about 1 Torr or less, computer 650 may close remote valve 621 and open remote valve 631. Embodiments may also include evacuating the pressure of tubing system 615 to about 1 mTorr or less. Computer 650 or monitoring device 630 may then instruct vacuum pump 625 to continue to decrease the pressure of tubing system 615. In some embodiments discussed herein, the evacuation pump and/or the vacuum pump may be referred to as a manifold pump.

When the pressure of either at least some portion of tubing system 615, or a detector cell inside monitoring device 630 is reduced to a threshold level, for example to about $10^{-5}$ to about $10^{-9}$ Torr, the monitoring device 630 may start scanning for gases in the tubing system 615. This gas may be gas 'A,' and originate from a leak in closed valve 605. Monitoring device 630 may determine the mass of particles of Gas 'A' in tubing system 615 and report the mass to computer 650. Computer 650 may, based possibly in part on the stored value and the pressure in tubing system 615, determine a leak rate. The leak rate may be reported to user, possibly in cubic centimeters per second. In these or other embodiments, computer 650 may generate a mass spectrum from data produced by monitoring device 630. The mass spectrum may represent masses for one or more of a plurality of gases detected by monitoring device 630.

If a user desires to test leaks for different types of gases, the system may be calibrated using different calibration leak sources containing the different gases. The computer may store values for each of these sources and allow a user to test for these types of gases, or possibly other types of gases by interpolating or extrapolating from stored values for calibrated gases. Apparatus 600 may also include, in some embodiments, a particle counter 660 to count particles created by reactions and bonding occurring between the subject gas in the gas cylinder and other fluids, possibly those introduced into tubing system 615 for that express purpose as discussed above. Particle counter 660 may be located elsewhere in the apparatus, but is shown in this exemplary embodiment as being between valve 631 and monitoring device 630. Similarly, particle counters may be employed in other embodiments of the invention, including those shown in FIG. 1, FIG. 2 and FIG. 3.

Figure 7:
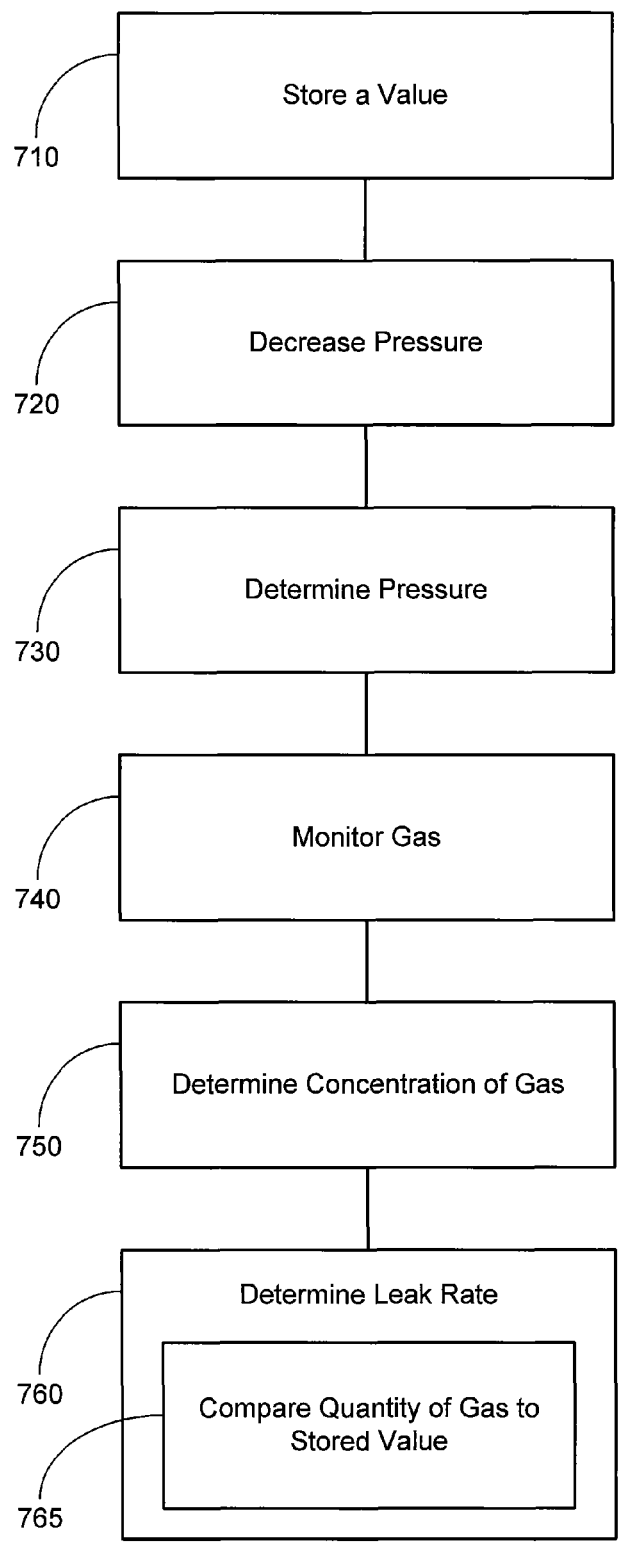

FIG. 7 shows a block diagram of a method 700 according to one embodiment of the invention for determining a leak rate of a gas from a closed valve. At block 710, after a calibration process is run for a certain gas, a value is stored which is representative of a certain leak rate for the gas. At block 720, the pressure of the downstream side of a closed valve is decreased. At block 730, the pressure of the downstream side of the closed valve is determined. If the pressure is at a predetermined level, or possibly lower, the gas is monitored at block 740. A concentration of gas is determined at block 750. At block 760, the leak rate is determined, possibly by, at block 765, comparing the determined concentration of gas to the stored value for the gas determined during the calibration process. This leak rate may possibly be reported to a user in cubic centimeters per second.

Figure 8:
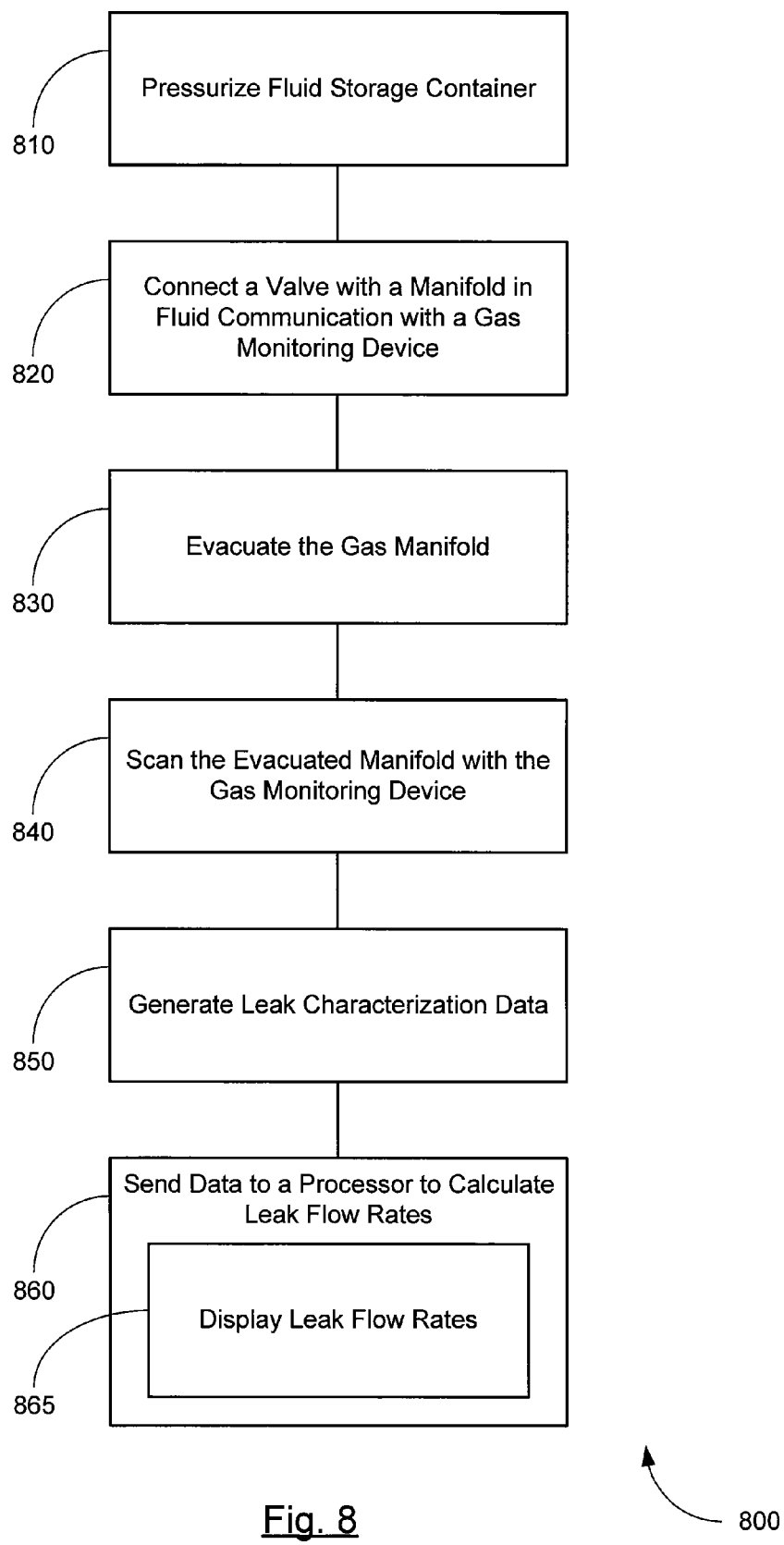

FIG. 8 shows a block diagram of a method 800 according to another embodiment of the invention for characterizing a leak in a fluid storage container. At block 810, the method may include a step of pressurizing the fluid storage container with a leak testing fluid before connecting the container with the leak characterization apparatus. The leak testing fluid may be compressed air, hydrogen, oxygen, helium, nitrogen, ammonia, arsine, phosphine, silane, acetylene, a halogen, a hydrogen halide, or a boron halide. At block 820, the method may include a step of connecting a valve on the fluid storage container with a leak characterization apparatus. The leak characterization apparatus may include a gas manifold, where the manifold is in fluid communication with a valve coupler that connects with the valve on the container and a gas monitoring device.

At block 830, the method may include a step of evacuating the gas manifold. At block 840, the method may include a step of scanning the evacuated manifold with the gas monitoring device for a plurality of gases that may be emitted by the fluid storage container. The monitoring device may scan a mass range from about 1 atomic mass unit to about 400 atomic mass units. At block 850, the method may include a step of generating leak characterization data about one or more of the plurality of gases. The characterization data may include a mass spectrum of the plurality of gases emitted by the fluid storage container. At block 860, the method may include a step of sending leak characterization data to a processor operable to calculate leak flow rates for the one or more gases on a display in electronic communication with the processor. At block 865, the method may further include displaying the leak flow rates for the one or more gases on a display in electronic communication with the processor.

Figure 9:
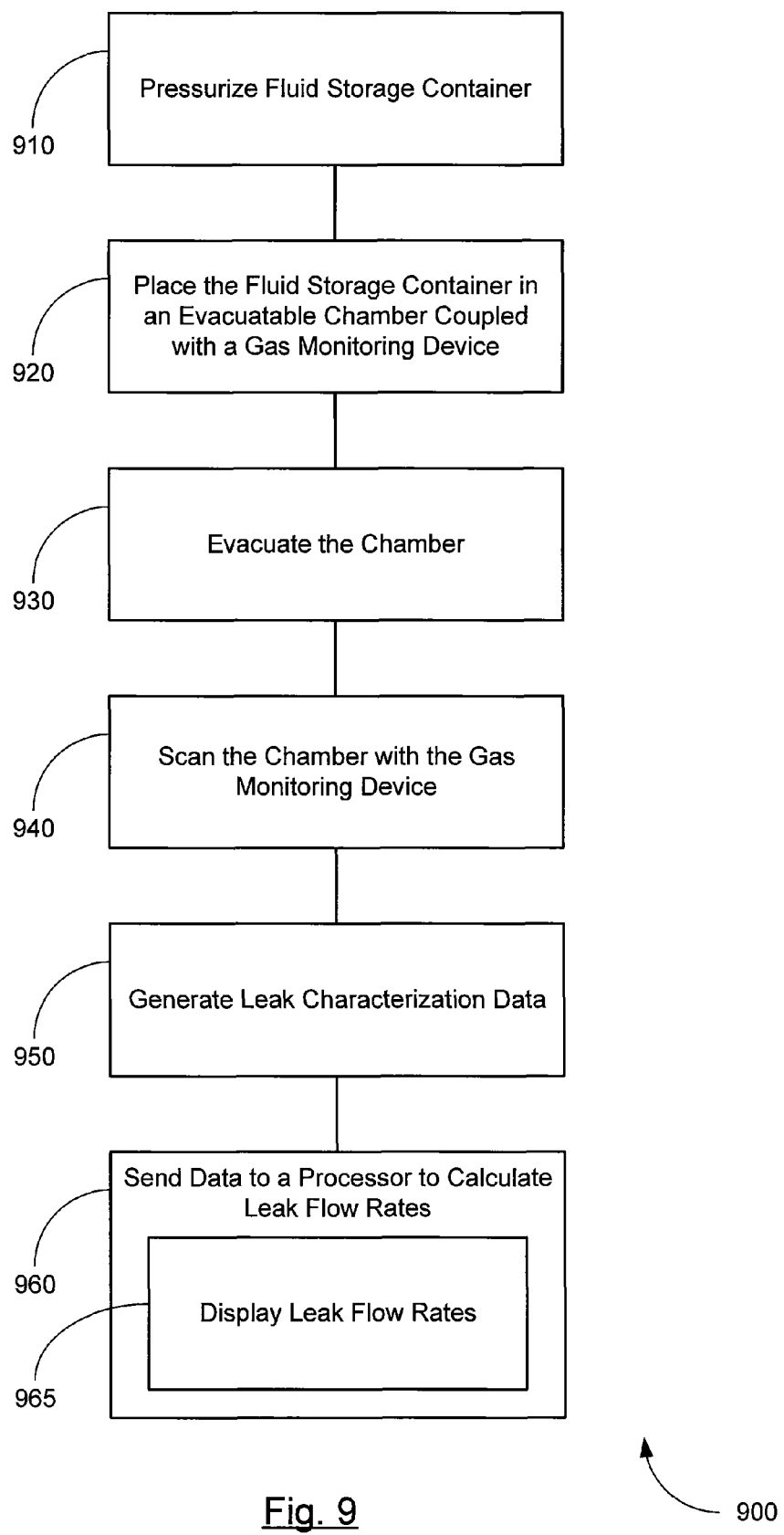

FIG. 9 shows a block diagram of a method 900 according to another embodiment of the invention for characterizing a leak in a fluid storage container. At block 910, the method may include a step of pressurizing the fluid storage container with a leak testing fluid before placing the container in the evacuatable chamber. At block 920, the method may include a step of placing the fluid storage container in an evacuatable chamber fluidly coupled with a gas monitoring device. The gas monitoring device may scan a mass range from about 1 atomic mass unit to about 400 atomic mass units. At block 930, the method may also include a step of evacuating the chamber.

At block 940, the method may include a step of scanning the chamber with the gas monitoring device for a plurality of gases that may be emitted by the fluid storage container. At block 950, the method may include a step of generating leak characterization data about one or more of the plurality of gases. The characterization data may include a mass spectrum of the plurality of gases emitted by the fluid storage container. At block 960, the method may include sending the leak characterization data to a processor operable to calculate leak flow rates for one or more of the plurality of gases. At block 965, the method may include displaying the leak flow rates for the one or or more gases on a display in electronic communication with the processor.

Figure 10:
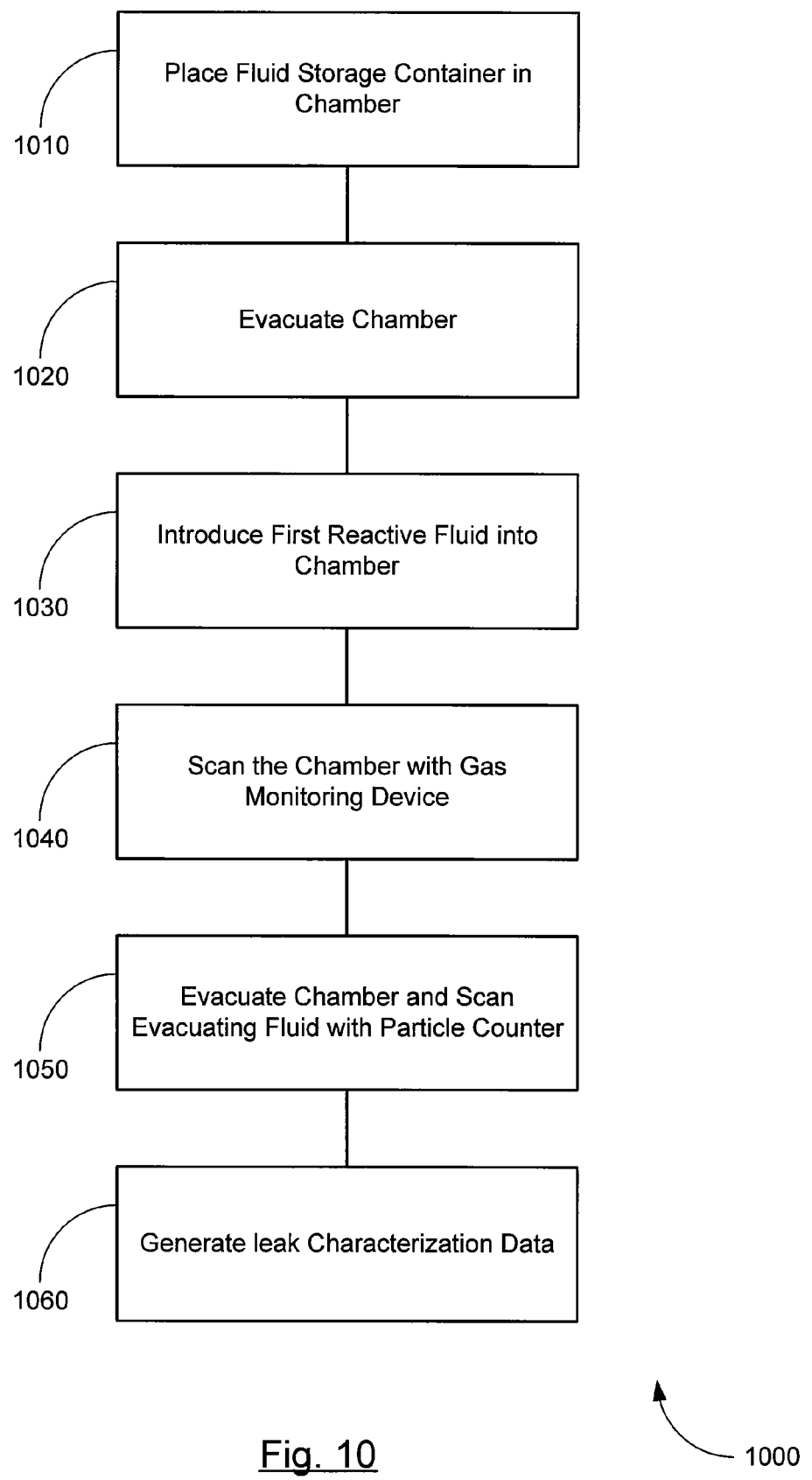

FIG. 10 shows a block diagram of a method 1000 according to another embodiment of the invention for characterizing a leak in a fluid storage container. At block 1010, the method may include placing a fluid storage container in a chamber. At block 1020, the method may include evacuating the chamber. At block 1030, the method may include introducing a first reactive fluid into the chamber. At block 1040, the method may include scanning the chamber with a gas monitoring device as in other methods discussed above. At block 1050, the method may include evacuating the chamber and scanning the evacuating fluid with a particle counter as discussed above. At block 1060, the method may include generating leak characterization data based at least in part on data from the particle counter. In some embodiments, the method may also include generating leak characterization data based further in part on data from the gas monitoring device.

Figure 11:
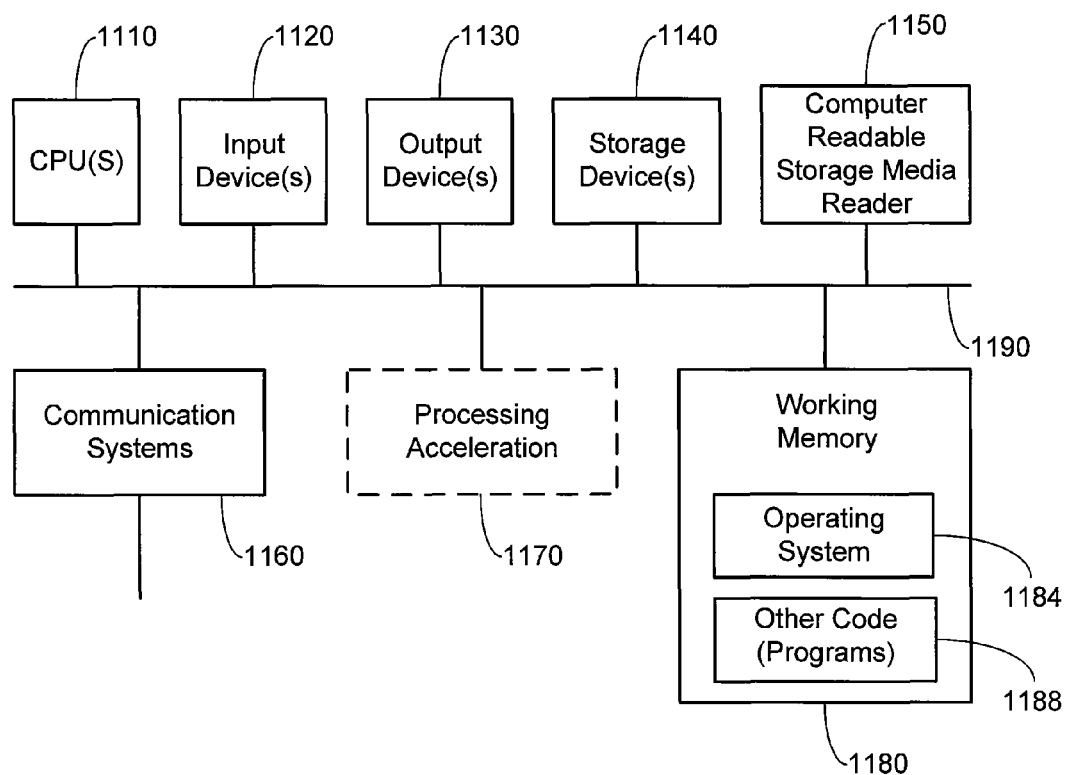

FIG. 11 is a block diagram illustrating an exemplary computer system 1100 in which embodiments of the present invention may be implemented. This example illustrates a computer system 1100 such as may be used, in whole, in part, or with various modifications, to provide the at least some of the functions of the pressure measuring device, the monitoring device, the particle counter, the computer, and/or other components of the invention such as those discussed above. For example, various functions of the monitoring device may be controlled by the computer system 1100, including, merely by way of example, determining the concentration of gases, etc.

The computer system 1100 is shown comprising hardware elements that may be electrically coupled via a bus 1190. The hardware elements may include one or more central processing units 1110, one or more input devices 1120 (e.g., a mouse, a keyboard, etc.), and one or more output devices 1130 (e.g., a display device, a printer, etc.). The computer system 1100 may also include one or more storage device 1140. By way of example, storage device(s) 1140 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1150, a communications system 1160 (e.g., a modem, a network card (wireless or wired), an infra-red communication device, Blutetooth™ device, cellular communication device, etc.), and working memory 1180, which may include RAM and ROM devices as described above. In some embodiments, the computer system 1100 may also include a processing acceleration unit 1170, which can include a digital signal processor, a special-purpose processor and/or the like.

The computer-readable storage media reader 1150 can further be connected to a computer-readable storage medium, together (and, optionally, in combination with storage device(s) 1140) comprehensively representing remote, local, fixed, and/or removable storage devices plus storage media for temporarily and/or more permanently containing computer-readable information. The communications system 1160 may permit data to be exchanged with a network, system, computer and/or other component described above.

The computer system 1100 may also comprise software elements, shown as being currently located within a working memory 1180, including an operating system 1184 and/or other code 1188. It should be appreciated that alternate embodiments of a computer system 1100 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 1100 may include code 1188 for implementing any or all of the function of the various elements of the architecture as described herein. For example, software, stored on and/or executed by a computer system such as system 1100, can provide the functions of the pressure measuring device, the monitoring device, the particle counter, the computer, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method to characterize a leak in a fluid storage container, the method comprising:
    placing the fluid storage container in an evacuatable chamber fluidly coupled with a gas monitoring device;
    evacuating the chamber;
    introducing a first reactive fluid into the chamber, wherein the first reactive fluid reacts with a fluid that may be emitted by the fluid storage container to produce particles;
    scanning the chamber with the gas monitoring device for a plurality of gases that may be emitted by the fluid storage container;
    evacuating fluid from the chamber and scanning the evacuated fluid with a particle counter; and
    generating leak characterization data about one or more of the plurality of gases based at least in part on data from the gas monitoring device and data from the particle counter.

2. The method to characterize a leak in a fluid storage container of claim 1, wherein the first reactive fluid comprises oxygen and the particles comprise oxides.

3. The method to characterize a leak in a fluid storage container of claim 1, further comprising introducing a second reactive fluid to the particles, wherein the second reactive fluid bonds with the particles to make at least a portion of the particles larger.

4. A method to characterize a leak in a fluid storage container, the method comprising:
   placing the fluid storage container in an evacuatable chamber fluidly coupled with a gas monitoring device;
   evacuating the chamber;
   introducing a first reactive fluid into the chamber, wherein the first reactive fluid reacts with a fluid that may be emitted by the fluid storage container to produce particles;
   evacuating fluid from the chamber and scanning the evacuating fluid with a particle counter; and
   generating leak characterization data about one or more of the plurality of gases based at least in part on data from the particle counter.

5. The method to characterize a leak in a fluid storage container of claim 4, further comprising introducing a second reactive fluid to the particles, wherein the second reactive fluid bonds with the particles to make at least a portion of the particles larger.

\* \* \* \* \*